(12) United States Patent
Honma

(10) Patent No.: US 7,257,226 B1
(45) Date of Patent: Aug. 14, 2007

(54) INFORMATION MANAGEMENT METHOD AND INFORMATION MANAGEMENT APPARATUS

(75) Inventor: Hiroyuki Honma, Chiba (JP)

(73) Assignee: Sony Corporation, Tokyo (JP)

( * ) Notice: Subject to any disclaimer, the term of this patent is extended or adjusted under 35 U.S.C. 154(b) by 393 days.

(21) Appl. No.: 09/695,623

(22) Filed: Oct. 24, 2000

(30) Foreign Application Priority Data

Oct. 27, 1999 (JP) .............................. P11-306131

(51) Int. Cl.
*G06F 12/14* (2006.01)
*H04N 7/167* (2006.01)

(52) U.S. Cl. ..................... 380/201; 713/193; 704/230

(58) Field of Classification Search ................ 380/201; 713/193
See application file for complete search history.

(56) References Cited

U.S. PATENT DOCUMENTS

| | | | |
|---|---|---|---|
| 5,359,725 A | * | 10/1994 | Garcia et al. ............... 707/200 |
| 5,392,265 A | * | 2/1995 | Takezawa ................ 369/53.24 |
| 5,708,650 A | * | 1/1998 | Nakashima et al. ...... 369/275.3 |
| 6,314,391 B1 | * | 11/2001 | Tsutsui et al. .............. 704/214 |

* cited by examiner

*Primary Examiner*—Nasser Moazzami
*Assistant Examiner*—Brandon Hoffman
(74) *Attorney, Agent, or Firm*—Sonnenschein Nath & Rosenthal LLP

(57) ABSTRACT

An information management method and an information management apparatus can minimize the confusion and the degradation of signal quality that can arise in terms of the compatibility of an apparatus adapted to a set of new standards and another apparatus adapted to a set of old standards. The protection flag of track mode is made equal to 1 as protection information for protecting the recording area of a disk carrying strings of codes according to the new standards from recording, editing and erasing operations of an apparatus conforming to the old standards and adapted to be able to refer only the management data area of the disk. When the disk carrying strings of codes recorded according to the new standards is used by the apparatus conforming to the old standards, the recording area of the disk is protected from recording, editing and erasing operations of the apparatus conforming to the old standards as the protection flag is 1.

16 Claims, 19 Drawing Sheets

INFORMATION MANAGEMENT METHOD AND INFORMATION MANAGEMENT APPARATUS

BACKGROUND OF THE INVENTION

1. Field of the Invention

This invention relates to an information management method and an information management apparatus for ensuring the compatibility of a recording medium storing signals that are coded by different methods.

2. Related Background Art

Recording media such as magneto-optic disks that are adapted to record coded signals of acoustic or sound information (to be referred to as audio signals hereinafter) have been expanding the market.

Meanwhile, when recording audio signals on a magneto-optic disk, it is a popular practice to compress the information of the audio signals to reduce the amount thereof by processing them for high-efficiency coding.

Various techniques are known to date for high-efficiency coding of audio signals including, for example, the blocking/frequency band splitting system, which is also referred to as transform coding, of blocking the audio signals on a time base by using a predetermined time unit, transforming (spectrum transform) the signals of each block on the time basis into signals on a frequency base, splitting them into a plurality of frequency subbands and coding the signals in each band or the non-blocking frequency band splitting system, which is also referred to as subband coding (SBC), of splitting the audio signals on a time base into a plurality of frequency subbands and coding the signals without blocking the audio signals. Additionally, high-efficiency coding techniques realized by combining transform coding and subband coding have been proposed. With such a technique, for example, the frequency band is divided into subbands by means subband coding and the signals of each subband are subjected to spectrum transform so as to be transformed into signals on a frequency base, which are then coded on a subband by subband basis.

Filters that are used as band splitting filters for subband coding include so-called QMFs (quadrature mirror filters). "Digital Coding of Speech in Subbands", R. E. Crochiere, Bell Syst. Tech. J., Vol. 55, No. 8, 1976 describes a QMF. The QMF described in the above document is devised to utilize the phenomenon that, if an aliasing noise is generated by thinning out the signals that are subjected to subband coding using the QMF to make them show a half signal rate, the aliasing noise generated by the decimation is cancelled by the aliasing noise generated in the subsequent band synthesis. Therefore, the coding loss can be substantially eliminated by using a QMF as time splitting filter so long as the signals of each subband are coded with a satisfactory level of accuracy.

"Polyphase Quadrature Filters—A New Subband Coding Technique", Joseph H. Rothweiler, ICASSP 83, BOSTON describes a band splitting technique using a PQF. The PQF described in the above paper is devised to utilize the phenomenon that, if the signals that are subjected to subband coding using the PQF are thinned out to show a signal rate corresponding to the related bandwidth and consequently aliasing noises are generated between adjacent subbands, the generated aliasing noises are cancelled by the aliasing noises that are generated between adjacent subbands in the subsequent band synthesis. Therefore, again, the coding loss can be substantially eliminated by using a PQF as time splitting filter so long as the signals of each subband are coded with a satisfactory level of accuracy.

Spectrum transform techniques include those adapted to split the input audio signals into blocks on the basis of a predetermined time unit (frame) and transform the signals on a time base into those on a frequency base by subjecting them to discrete Fourier transform (DFT), discrete cosine transform (DCT) or modified discrete cosine transform (MDCT) on a block by block bases. For MDCT, refer to "Subband/Transform Coding Using Filter Bank Designs Based on Time Domain Aliasing Cancellation", J. P. Princen, A. B. Bradley, Univ. of Surrey Royal Melbourne Inst. Of Tech. ICASSP 1987.

When DFT or DCT is used for the purpose of spectrum transform of waveform signals on the basis of a time block of M sample data (hereinafter to be referred to as transform block), a total of M independent real number data will be obtained. Then, normally, M1 sample data are made to overlap between two adjacent transform blocks in order to alleviate the connection distortion between transform blocks. Thus, with DFT or DCT, a total of M real number data are obtained in average for (M-M1) sample data. The M real number data will be subsequently quantized and coded.

When, on the other hand, MDCT is used for the purpose of spectrum transform of waveform signals, a total of M independent real number data will be obtained for each transform block out of 2M samples produced by causing M samples thereof to overlap between two adjacent transform blocks. In other words, when MDCT is used, a total of M real number data are obtained in average for M sample data. The M real number data will then be quantized and coded. With a decoder adapted to use MDCT for spectrum transform and decode quantized and coded signals, the original waveform signal can be reconstructed by adding the waveform elements obtained through inverse transformation of the coded signals for each block, causing them to interfere with each other.

Generally, the frequency resolution is enhanced to give rise to a phenomenon of concentration of energy on a specific spectrum signal component if the transform blocks for spectrum transform are made long. Therefore, a coding operation can be conducted more efficiently by using MDCT than by using DFT or DCT because, if a long transform block length is used for spectrum transform with MDCT, a half of the total number of sample data are made to overlap between two adjacent transform blocks and the number of the obtained spectrum signal components is not increased relative to the number of the original sample data on the time base. Additionally, the connection distortion between transform blocks of waveform signals can be alleviated by causing adjacent transform blocks to overlap by a sufficiently long span. However, it should be noted that a long transform block means that more work areas are required for the transform to possibly baffle the efforts for down-sizing the signal reproduction means. Particularly, the use of a long transform block can entail a cost rise when it is difficult to raise the degree of integration of semiconductors.

Meanwhile, with the above described technique of splitting the signal frequency bands by means of a filter and spectrum transform, the quantization noise generation band can be limited when quantizing the signal components obtained by the band division. In other words, it is possible to perform a coding operation highly efficiently in terms of the auditory perception by limiting the quantization noise generation band, typically utilizing the masking effect. The masking effect refers to an effect that a large sound hides a small sound to the ears. Thus, the signal sound itself can be made to hide the quantization noise generated as a result of quantization due to the masking effect. Therefore, if audio signals are compressed in a way that maximally exploits the masking effect, the sound reproduced from the audio signals obtained by expanding the compressed audio signals will be almost the same as the original sound to the ears in terms of sound quality. However, it should be noted that the generation of quantization noise has to be controlled in terms of both time and frequency in order to maximally exploit the masking effect. More specifically, the masking effect can vary along the time base in terms of the duration of the effect and as far as an attack where the signal level abruptly rises from a relatively low level to a high level is concerned, the masking effect works only several milliseconds temporally before the attack whereas it works for a considerably long time after the attack. Therefore, assuming a transform block containing an attack and low level signals located before and after the attack, if a low level signal is found for more than several milliseconds temporally before the attack and the level of the quantization noise generated in the transform block is higher than that of the low level signal, the level of the quantization noise generated in the transform block exceeds that of the low level signal (and hence is not hidden by the small sound of the low level signal) so that there arises a phenomenon of so-called pre-echo that is very harsh to the ears.

In view of this problem, there are occasions where a technique of shifting the length of the transform block to be used for spectrum transform depending on the signals contained in the transform block. More specifically, if the transform block contains an attack and low level signals located before and after the attack, the length of the transform block shifted to show a small length so that no pre-echo may occur there. It will be appreciated that the coding operation can be conducted more efficiently if the largest one of the absolute values of the signal components in each subband is determined prior to the quantization and the signal components of the band are normalized by referring to the largest value.

When each of the signal components obtained by splitting the frequency band of the audio signal is quantized in a manner as described above, the subbands obtained by splitting the frequency band preferably has a bandwidth that matches the human sense of hearing. In other words, when splitting the frequency band of an audio signal, it is preferable to divide the audio signal into a plurality of subbands (e.g., 25 subbands) having respective band widths that increases as a function of frequency (cristical band).

Additionally, the operation of coding the data of the subbands obtained by frequency splitting is preferably carried out by allocating a predetermined number of bits or by adaptively allocating an appropriate number of bits to each of the subbands (bit allocation). For instance, the technique of adaptively allocating an appropriate number of bits to the MDCT coefficient data of each subband obtained by MDCT conducted on each transform block will be used for the operation of coding the coefficient data obtained by MDCT.

Two types of techniques are known to date for bit allocation.

"Adaptive Transform Coding of Speech Signals", R. Zelinski and P. Noll, IEEE Transactions of Acoustics, Speech and Signal Processing, Vol. ASSP-25, No. 4, August 1997 describes a technique of bit allocation based on the signal size of each subband. However, while a flat quantization noise spectrum is produced to minimize the noise energy with this technique, the actual feeling of hearing noise is not optimal to the auditory sense because it does not utilize the masking effect.

On the other hand, "The Critical Band Coder—Digital Encoding of the Perceptual Requirements of the Auditory Systems", M. A. Kransner, MIT, ICASSP 1980 describes a technique of invariably allocating bits to subbands by determining the necessary S/N ratio for each subband, utilizing the auditory masking effect. However, with this technique, the observed characteristics of the input sine wave are not particularly encouraging because the bit allocation is stationary and invariable.

In an attempt for dissolving the above identified problems, there has been a proposed high-efficiency coding technique of splitting the entire allocatable bits into those for a fixed bit allocation pattern predetermined for each small block and those to be allocated depending on the signal size of each block and selecting the splitting ratio depending on a signal related to the input signal so that the fixed bit allocation pattern takes a large ratio when the signal shows a smooth spectrum pattern.

This technique can remarkably improve the overall S/N characteristics in the case of a signal where energy is concentrated on a specific spectrum signal component such as a sine wave because, with this technique, a large number of bits are allocated to the block containing the spectrum signal component. Generally, the human auditory sense is keen to a signal containing a steep spectrum signal component. Therefore, the use of this technique of improving the S/N characteristics is effective for improving not only the numerical values obtained by observation but also the sound quality as sensed by the auditory perception.

There are many other techniques proposed for bit allocation, according to which models that are by far more sophisticated than the one used with the above described technique can be formed to improve the ability of the coding device of highly efficiently carrying out a coding operation in terms of the human auditory sense.

When allocating bits, it is a general practice to determine a reference value of a real number for bit allocation in order to reliably produce the computationally obtained S/N characteristics and select an integer approximating the reference value for the number of bits that are actually allocated.

When forming an actual code string, firstly the quantization accuracy information and the normalization coefficient information are coded in a predetermined number of bits for each subband that is subjected to normalization and quantization. Then, the spectrum signal component that is normalized and quantized is coded.

The ISO Standards (ISO/IEC 11172-3:1993 (E), a993) describes a high-efficiency coding system that is so devised as to differentiate the number of bits expressing the quantization accuracy information from subband to subband, with which the number of bits expressing the quantization accuracy information is decreased as a function of frequency.

There is also known a technique of determining the quantization accuracy information typically from the normalization coefficient information in a decoder instead of directly encoding the quantization accuracy information. However, with this technique, the relationship between the normalization coefficient information and the quantization accuracy information becomes fixed when the standards are installed so that it is no longer possible to introduce an improved system for controlling the quantization accuracy on the basis of an enhanced auditory model in the future.

Additionally, "A Method for Construction of Minimum Redundancy Codes", D. A. Huffman: Proc. I. R. E., 40. P. 1098 (1952) describes a method of efficiently coding quantized spectrum signal components by using variable length codes.

Still additionally, Japanese Patent Application Laid-Open No. 6-828633 filed by the applicant of this patent application proposes in its specification and drawings a method of isolating tone-related components that are important to the human auditory sense from the spectrum signal components and coding them separately from the remaining spectrum signal components. With proposed method, it is possible to efficiently encode audio signals to a high compression ratio practically without degrading the sound quality to the auditory sense.

Note that any of the above listed coding techniques is applicable to each channel of an acoustic signal constituted by a plurality of channels. For instance, any of them may be applied separately to the L channel that corresponds to the left-side loudspeaker and also to the R channel that corresponds to the right-side loudspeaker. Furthermore, any of them may be applied to the (L+R)/2 signal obtained by adding the signal of the L channel and that of the R channel or both of the (L+R)/2 and (L−R)/2 signals for efficient coding. For example, Japanese Patent Application Laid-Open No. 10-336039 filed by the applicant of this patent application proposes in its specification and drawings a method of reducing the bandwidth of the (L−R)/2 signal relative to the that of the (L+R)/2 signal, paying attention to the fact that the feeling of stereophony is dominantly affected by low frequency side signals. With this technique, it is possible to efficiently carry out a coding operation, using a reduced number of bits, while maintaining the feeling of stereophony as perceived by the auditory sense. It should be noted here that, since the amount of data required for coding signals of a channel is half of that of data for coding signals of two channels independently, a technique of establishing a set of standards providing both a mode for recording monaural signals of a single channel and a mode for recording stereo signals of two channels is popularly used so that signals may be recorded as monaural signals when a long recording time is expected for recording signals on a recording medium.

As described above, novel techniques for improving the coding efficiency have been developed almost incessantly so that, if a set of standards accommodating a newly developed coding technique is used, it will normally be possible to record signals for a prolonged period of time on an information recording medium or, if the recording time is the same, record higher quality audio signals.

When establishing a new set of standards, provisions are normally made to accommodate possible revisions and/or extensions in the future so that flag information and other necessary pieces of information relating to the standards may be recorded on the recording medium in advance. For instance, a 1-bit flag information of "0" may be recorded on the recording medium when the standards are established for the first time and the flag information may be turned to "1" when the standards are revised. With this arrangement, an apparatus that is adapted to the revised standards checks if the flag information recorded on the recording medium is equal to "0" or "1" and reads and reproduces signals from the information recoding medium according to the revised standards if the flag information is "1", whereas it reads and reproduces signals from the information recording medium according to the original standards if the flag information is "0" and the apparatus is not adapted to the original standards.

However, if apparatus that can reproduce signals that are recorded according to a set of standards (which is to be referred to as "the old standards" or "the first coding system" hereinafter) become popular and widely used and a new set of standards accommodating a more efficient coding system, which may be superceding standards, (which is to be referred to as "the new standards" or "the second coding system" hereinafter) is established, the users of the apparatus will have to experience the inconvenience of not being able to replay any information recording medium where signals are recorded according to the new standards. Apparatus that can reproduce and/or record signals according to the old standards will be referred to as apparatus adapted to the old standards hereinafter.

Particularly, there may be apparatus that are adapted to the old standards and try to reproduce all the signals recorded on the information recording medium as if they are coded according to the old standards, disregarding the flag information recorded on the information recording medium. In other words, if the information recording medium stores signals coded according to the new standards, the apparatus adapted to the old standards cannot recognize it. Then, if the apparatus adapted to the old standards tries to reproduce signals recorded according to the new standards as if they are signals recorded according to the old standards, the apparatus may not operate properly and/or give rise to terrible noises.

Additionally, if signals coded according to the old standards and those coded according to the new standards are recorded on a same recording medium, less storage areas will inevitably be allocated to them to make it difficult to maintain a required level of quality for the signals that are recorded and reproduced.

On the other hand, Japanese Patent Application Laid-Open No. 10-302405 filed by the applicant of the present patent application proposes a technique with which an apparatus adapted to the old standards can reproduce signals coded according to the old standards if the recording medium stores both signals coded according to the old standards and those coded according to the new standards while an apparatus adapted to the new standards can reproduce from the recording medium both signals coded according to the old standards and those coded according to the new standards and any possible degradation of signal quality that can arise when signals coded according to different sets of standards are recorded on a same information recording medium can be minimized. Note that, in the following description, an apparatus that can reproduce and/or record signals coded according to the new standards, which may be superceding standards, is referred to as apparatus adapted to the new standards.

However, a variety of problems can take place to confuse the user when signals coded according to the old standards are added to an information recording medium storing signals coded according to old standards and those coded according to the new standards by means of an apparatus adapted to the old standards or an operation of track splitting and/or track coupling by way of track erasing and track editing is repeatedly conducted.

To be more accurate, while management data (so-called TOC) including track replay mode information, start address information and end address information have to be stored in the management data area of the recording medium defined by the old standards so that they may be referred to by an apparatus adapted to the old standards, data on the additional information (extended information) such as the information on the replay mode adapted to the new standards and necessary for an apparatus adapted to the new standards to reproduce value-added data have to be stored in an area (extended management data area) that can be referred to only by an apparatus adapted to the new standards so that they may not be referred to nor erased by an apparatus adapted to the old standards.

More specifically, assume here that apparatus adapted to the new standards can accommodate both mode a and mode c while apparatus adapted to the old standards can accommodate only mode a and the signals stored in an information recording medium are adapted to both the features of mode a and those of mode c. Also assume that the above signals are divided into two parts by using the editing feature of the apparatus adapted to the old standards and the replay mode information for the signals of the latter part is stored in mode a in the management data area of the information recording medium provided for the old standards. Then, if the information recording medium is replayed by the apparatus adapted to the new standards, the signals stored in the information recording medium can be reproduced only in mode a adapted only to the old standards, although they are actually signals (code string) adapted to both the features of mode a and those of mode c. In such a case, the quality of the signals are no longer maintained and the user of the apparatus adapted to the new standards will be very confused.

Assume now that the signals stored in the information recording medium are adapted to both the features of mode a and those of mode c and signals adapted to both mode a and mode c are stored in the extended management data area for the new standards. Also assume that the above signals are erased by an apparatus adapted to the old standards and additional signals are recorded by the apparatus adapted to the old standards in mode a. Then, extended replay mode information indicating that signals adapted to both mode a and mode c is left unerased in the extended management data area for the new standards on the information recording medium. Therefore, when the information recording medium is replayed by an apparatus adapted to the new standards, the apparatus will wrongly recognize that the signals stored on the information recording medium are those adapted to both mode a and mode c on the basis of the extended replay mode information left unerased in the extended management data area. Then, in the worst case, the apparatus adapted to the new standards can run away to terribly degrade the signal quality and confuse the user.

BRIEF SUMMARY OF THE INVENTION

In view of the above identified problems, it is therefore the object of the present invention to provide an information management method and an information management apparatus that can minimize the confusion and the degradation of signal quality that can arise in terms of the compatibility of an apparatus adapted to the new standards and another apparatus adapted to the old standards.

According to the invention, the above object is achieved by providing an information management method comprising:

generating protection information for protecting the storage area of a recording medium storing a second string of codes recorded by a second coding technique from any recording, editing and erasing operations of a first apparatus adapted to handle a first string of codes by a first coding technique and refer to the first management data stored in a first management area;

arranging said protection information in the first management data area as one of said first management data; and protecting the storage area of the medium storing said second string of codes from any recording, editing and erasing operations of said first apparatus on the basis of said protection information when the medium storing said second string of codes is operated by said first apparatus.

In another aspect of the invention, there is provided an information management apparatus comprising:

a means for generating protection information for protecting the storage area of a recording medium storing a second string of codes recorded by a second coding technique from any recording, editing and erasing operations of a first apparatus adapted to handle a first string of codes by a first coding technique and refer to the first management data stored in a first management area;

a means for arranging said protection information in the first management data area as one of said first management data; and a means for protecting the storage area of the medium storing said second string of codes from any recording, editing and erasing operations of said first apparatus on the basis of said protection information when the medium storing said second string of codes is operated by said first apparatus.

Thus, with an information management method and an information management apparatus according to the invention, it is now possible to minimize the confusion and the degradation of signal quality that can arise in terms of the compatibility of an apparatus adapted to a first coding technique and another apparatus adapted to a second coding technique.

In other words, according to the invention, when both codes according to a set of old standards and those according to a set of new standards are stored on a same recording medium and the recording medium is used by an apparatus adapted to the old standards, it is possible for an apparatus adapted to the new standards to operate for recording, reproducing, editing and erasing data the apparatus adapted to the old standards is prohibited from operating for recording, editing and erasing but allowed to reproduce codes according to the old standards or those according to the new standards in order to prevent any confusion on the part of the user using the apparatus adapted to the old standards to record, edit or erase codes.

Additionally, according to the invention, if only strings of codes according to the old standards are left on the recording medium as a result of the editing and erasing operations of an apparatus adapted to the new standards, an apparatus adapted to the old standards can be used to record, edit and/or erase codes. Still additionally, according to the invention, an apparatus adapted to the old standards can be made to record, edit and erase codes on a medium storing strings of codes according to the new standards, while minimizing the cost of providing the apparatus additionally with a coding/decoding section adapted to the new standards.

BRIEF DESCRIPTION OF THE SEVERAL
VIEWS OF THE DRAWING

DETAILED DESCRIPTION OF THE INVENTION

Now, the present invention will be described in greater detail by referring to the accompanying drawings that illustrate preferred embodiments of the invention.

Figure 1:
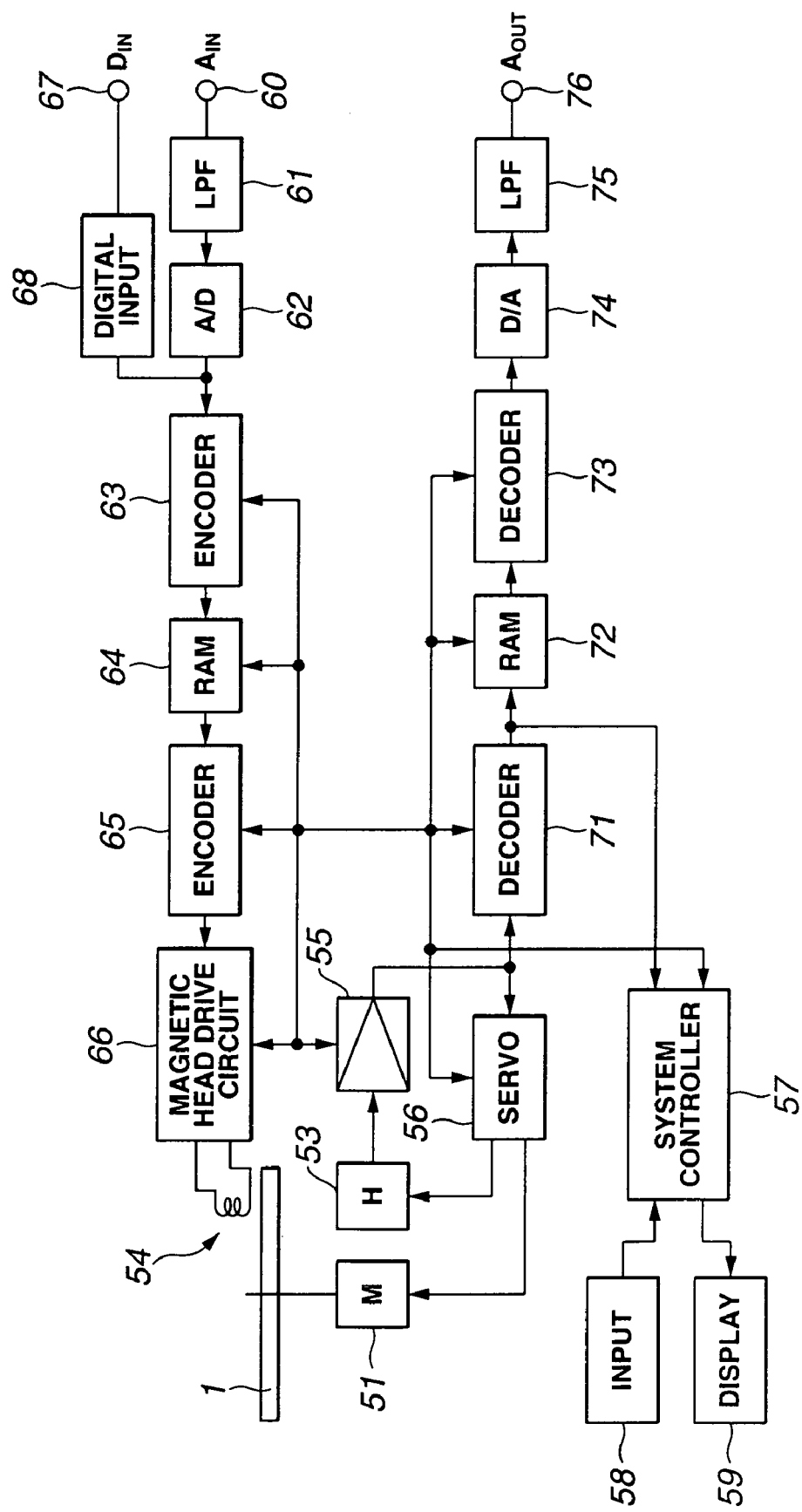
FIG. 1 is a schematic block diagram of an embodiment of recording/reproduction apparatus adapted to handle compressed data according to the invention.

FIG. 1 is a schematic block diagram a compressed data recording/reproduction apparatus adapted to handle compressed data and realized by applying an embodiment of the present invention.

Now, the configuration of the apparatus of FIG. 1 will be described in detail.

With the compressed data recording/reproduction apparatus of FIG. 1, firstly a magneto-optic disk 1 adapted to be driven to revolve by a spindle motor 51 is used as recording medium. When recording data on the magneto-optic disk 1, a modulated magnetic field is applied to the data to be recorded by magnetic head 54 for magnetic field modulation recording, while the magneto-optic disk 1 is being irradiated with a laser beam from the optical head 53. When reproducing data from the magneto-optic disk 1, the recording track of the magneto-optic disk 1 is traced by a laser beam emitted from the optical head 53 for magneto-optical reproduction.

The optical head 53 typically comprises a laser beam source such as a laser diode, a collimator lens, an objective lens, a polarization beam splitter, a cylindrical lens and other optical components along with a photodetector having a light receiving section showing a predetermined pattern. The optical head 53 is arranged at a position opposite to said magnetic head 54 with the magneto-optic disk 1 interposed therebetween. When recording data on the magneto-optic disk 1, a modulated magnetic field is applied to the data to be recorded by driving the magnetic head 54 by means of head drive circuit 66 of the recording system of the apparatus which will be described hereinafter, while the target track of the magneto-optic disk 1 is irradiated with a laser beam emitted from the optical head 53 for thermo-magnetic recording in a magnetic modulation mode. The optical head 53 is adapted to detect the reflected beam of the laser beam irradiating the target track and also detect any focusing errors by means of the so-called astigmatism technique and any tracking errors by means of the so-called push-pull technique. When reproducing data from the magneto-optic disk 1, the optical head 53 detects focusing errors and tracking errors and, at the same time, detects the difference in the polarization angle of the laser beam (color rotational angle) reflected from the target track.

The output of the optical head 53 is fed to RF circuit 55. The RF circuit 55 extracts the focussing error signal and the tracking error signal from the output of the optical head 53 and sends them to servo control circuit 56, while it binarizes the regenerative signal and sends it to decoder 71 of the reproduction system of the apparatus which will be described hereinafter.

The servo control circuit 56 typically comprises a focusing servo control circuit, a tracking servo control circuit, a spindle motor servo control circuit and a sled servo control circuit. The focusing servo control circuit controls the focusing operation of the optical system of the optical head 53 so as to reduce the focusing error signal to nil. The tracking servo control circuit controls the tracking operation of the optical system of the optical head 53 so as to reduce the tracking error signal to nil. The spindle motor servo control circuit controls the spindle motor 51 so as to make it drive the magneto-optic disk 1 to rotate at a predetermined rotational speed (e.g., at a constant linear speed). The sled servo control circuit moves the optical head 53 and the magnetic head 54 to the target track of the magneto-optic disk 1 as specified by system controller 57. Thus, the servo control circuit 56 is adapted to perform various control operations and transmit information indicating the operations of various components that are controlled by the servo control circuit 56 to the system controller 57.

The system controller 57 is connected to a key input operation section 58 and display section 59. The system controller 57 controls the recording system and the reproduction system according to the information input through the key input operation section 58. The system controller 57 also controls the spot on the recording track being traced by the optical disk 53 and the magnetic head 54 for signal recording or signal reproduction according to the address information reproduced from the recording track of the magneto-optic disk 1 by using the header time on a sector by sector basis and the subcode Q data. The system controller 57 additionally controls the display section 59 so as to make it display the reproduction time on the basis of the data compression ratio of the compressed data recording/reproduction apparatus and the information on the replay position on the recording track.

The reproduction time is obtained by multiply the address information that is reproduced from the recording track of the magneto-optic disk 1 on a sector by sector basis by using the header time on a sector by sector bases and the subcode Q data by the reciprocal number of the data compression ratio (e.g., 4 if the compression ration is $1/4$) and displayed on the display section 59. If the absolute time information is recorded on the recording track of the magneto-optic disk (1) (and hence the disk is pre-formatted), it is also possible to read the absolute time information on the pre-formatted disk and multiply it by the reciprocal number of the data compression ratio so as to display the current position in terms of the actual recording time.

In the recording system of the disk recording/reproduction apparatus, the analog audio input signal AIN from input terminal 60 is fed to A/D converter 62 by way of low-pass filter 61 and the A/D converter 62 quantizes the analog audio input AIN. The digital audio signal produced from the A/D converter 62 is fed to ATC (adaptive transform coding) encoder 63. On the other hand, the digital audio input signal DIN from input terminal 67 is fed to the ATC encoder 63 by way of digital input interface circuit 68. The ATC is adapted to perform a bit compression (data compression) processing operation on the digital audio PCM data obtained by quantizing the input signal AIN by means of said A/D converter 62 and transmitted at a predetermined transfer rate according to the predetermined data compression ratio and the compressed data (ATC data) output from the ATC encoder 63 is fed to memory 64. If, for example, the data compression ratio is $1/8$, the data transfer rate is reduced to $1/8$ of that of the standard CD-DA format (75 sectors/sec.), or 9.3775 sectors/sec.

The memory 64 is controlled by the system controller 57 for data writing/reading operations and used as buffer memory for temporarily storing the ATC data fed from the ATC encoder 63, which data is then recorded on the disk whenever necessary. If, again, the data compression ratio is $1/8$, the compressed audio data fed from the ATC encoder 63 is reduced to $1/8$ of the data transfer rate of the standard CD-DA format (75 sectors/sec.), or 9.375 sectors/sec and compressed data are continuously written in the memory 64. While compressed data (ATC data) require only a sector out of eight sectors for being stored as described above, data are written in consecutive sectors in a manner as described hereinafter because it is practically impossible to record data in every eighth sector. The recording operation is carried out in a burst-like fashion on the basis of a recording unit of a cluster comprising a plurality of sectors (e.g., 32 sectors+ several sectors) at the data transfer rate of 75 sectors/sec. which is same as that of the standard CD-DA format, with quiescent periods provided in the recording operation.

More specifically, at the memory 64, ATC audio data written there continuously at a low transfer rate of 9.375 (=75/8) that corresponds to the bit compression ratio and showing a data compression ratio of $1/8$ are read out at the transfer rate of 75 sectors/sec. in a burst-like fashion as data to be recorded. While the overall data transfer rate of the data read out for recording is as low as 9.375 sectors/sec. including the quiescent periods, the instantaneous data transfer rate in the recording operation that is conducted on a burst-like fashion is same as the above standard rate of 75 sectors/sec. Therefore, when the rotational speed of the disk is same as that of the standard CD-DA format (constant linear speed), data are recorded at a recording density same as that of the standard CD-DA format to show a recording pattern that is also same as its counterpart of the standard CD-DA format.

The ATC audio data read out of the memory 64 for recording at a (instantaneous) transfer rate of 75 sectors/sec. in a burst-like fashion are then fed to the encoder 65. Note that, when recording the string of data fed from the memory 64 to the encoder 65, a cluster including a plurality of sectors (e.g., 32 sectors) and several sectors arranged at the front and back of the cluster for cluster connection is used as unit that is recorded at a time. The cluster connection sectors are so defined as to show a length greater than the interleaving length of the encoder 65 so that they may not affect the data of other clusters if they are interleaved.

The encoder 65 performs a coding operation (addition of parity codes and interleaving) for error correction and EFM coding operation on the data fed from the memory 64 in a burst-like fashion as described above. The data to be recorded that are processed for coding by the encoder 65 are then fed to the magnetic head drive circuit 66. The magnetic head drive circuit 66 is connected to the magnetic head 54 and drives the magnetic head 54 so as to make it apply a magnetic field that is modulated according to the data to be recorded to the magneto-optic disk 1.

The system controller 57 controls the memory 64 in a manner as described above and also controls the recording position of the data in such a way that the data read out of the memory 64 in a burst-like fashion under its control in a manner as described above are continuously recorded on the recording track of the magneto-optic disk 1. This recording position control is realized as the system controller 57 feeds the servo control circuit 56 with a control signal specifying the recording position on the recording track of the magneto-optic disk 1 that is controlled by the system controller 57 for the operation of recording the data read out of the memory 64 in a burst-like fashion.

Now the reproduction system of the apparatus will be described. The reproduction system is used to reproduce the data that are recorded continuously on the recording track of the magneto-optic disk 1 by the recording system and comprises a decoder 71 that is supplied with the reproduction output of the optical head 53 obtained by tracing the recording track of the magneto-optic disk 1 by means of a laser beam and binarized by the RF circuit 55. Note that reproduction system is adapted to reproduce signals not only from a magneto-optic disk but also from a replay-only optical disk similar to a compact disk (CD: trade name).

The decoder 71 corresponds to the encoder 65 of the recording system and is adapted to perform a processing operation of decoding for error correction and EFM decoding and reproduce ATC audio data with a data compression ratio of $1/8$ and at a transfer rate of 75 sectors/sec. that is higher than the normal transfer rate. The reproduced data from the decoder 71 is fed to the memory 72.

The memory 72 is controlled by the system controller 57 for the operation of writing data in and reading data from it. The reproduced data fed the decoder 71 at a transfer rate of 75 sectors/sec. are written in it at the same transfer rate of 75 sectors/sec. in a burst-like fashion. The reproduced data that are written in the memory 72 at a transfer rate of 75 sectors/sec. in a burst-like fashion are then read out continuously from it at a transfer rate of 9.375 sectors/sec. that corresponds to the data compression ratio ⅛.

The system controller 57 controls the memory 72 in such a way that the reproduced data are written there at a transfer rate of 75 sectors/sec. and read out continuously from it at a transfer rate of 9.375 sectors/sec. Additionally, the system controller 57 controls the position for reproducing the data in such a way that the data written in the memory 72 in a burst-like fashion under its control in a manner as described above are continuously reproduced from the recording track of the magneto-optic disk 1. This reproducing position control is realized as the system controller 57 feeds the servo control circuit 56 with a control signal specifying the reproducing position on the recording track of the magneto-optic disk 1 or the optical disk 1 that is controlled by the system controller 57 for the operation of reproducing the data read out of the memory 72 in a burst-like fashion.

The ATC audio data obtained as a result of an operation of continuously reading and reproducing data from the memory 72 at a transfer rate of 9.375 sectors/sec. are then fed to ATC decoder 73. The ATC decoder 73 corresponds to the ATC encoder 63 of the recording system and is adapted to reproduce 16-bit digital audio data by expanding (bit expansion) the ATC data by 8 times. The digital audio data from the ATC decoder 73 are then fed to D/A converter 74.

The D/A converter 74 converts the digital audio data fed from the ATC decoder 73 into an analog signal to produce analog audio output signal AOUT. The analog audio signal AOUT obtained by the D/A converter 74 is output from output terminal 76 by way of low-pass filter 75.

Now, the high-frequency compression coding will be discussed in detail. More specifically, the technology of high-efficiency coding an input digital signal such as an audio PCM signal, using the techniques of subband coding (SBC), adaptive transform coding (ATC) and adaptive bit allocation by referring to the related drawings including FIG. 2.

Figure 2:
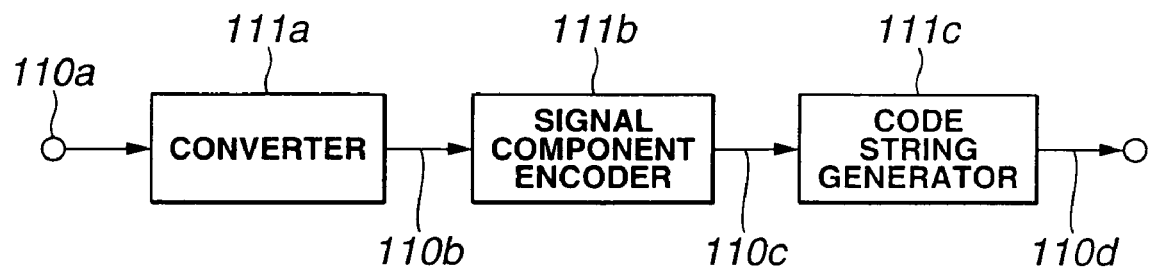
FIG. 2 is a schematic block diagram of an encoder devised according to the invention.

Referring to FIG. 2, with an information coding device for carrying out an information (acoustic waveform signal) coding method according to the invention, the input signal waveform 110a is transformed into signal frequency components 110b by converter 111a and each of the obtained signal frequency components 110b is coded by signal component encoder 111b. Subsequently, code string generator 111c generates a string of codes 110d out of the coded signals 110c obtained by the signal components encoder 111b.

Figure 3:
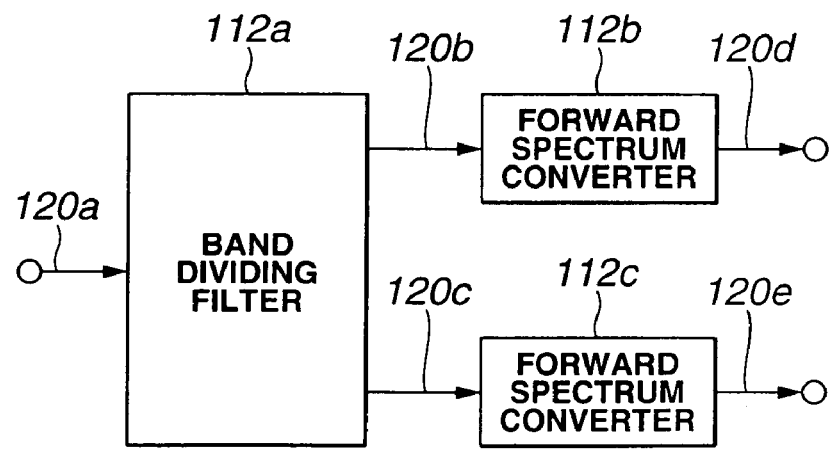
FIG. 3 is a schematic block diagram of a signal component encoder devised according to the invention.

Referring to FIG. 3, at the converter 111a, the input signal 120a is split into two subbands by a band splitting filter 112a and the subband signals 120b, 120c obtained by splitting the input signal are respectively transformed into spectrum signal components 120d, 120e by respective forward converters 112b, 112c. Note that the input signal 120a corresponds to the signal waveform 110a in FIG. 2 and the spectrum signal components 120d, 120e correspond respectively to the signal frequency components 110b in FIG. 2. In the converter 111a having the configuration as illustrated in FIG. 3, the bandwidth of each of the signals 120b, 120c obtained by splitting into two subbands is equal to ½ of that of the input signal 120a. In other words, the input signal 120a is decimated to ½. It may be needless to say that many alternative configurations are conceivable for the converter 111a. For example, it may be so arranged that the input signal is directly transformed into a spectrum signal by MDCT. A transform technique such as DFT or DCT may be used instead of MDCT for the purpose of the invention. While it is also possible to split a signal into subband components by means of a band splitting filter, it is advantageous for the purpose of the present invention to use a technique of transforming a signal into frequency components because many frequency components can be obtained with a limited number of arithmetic operations when an information coding method according to the invention is used.

Figure 4:
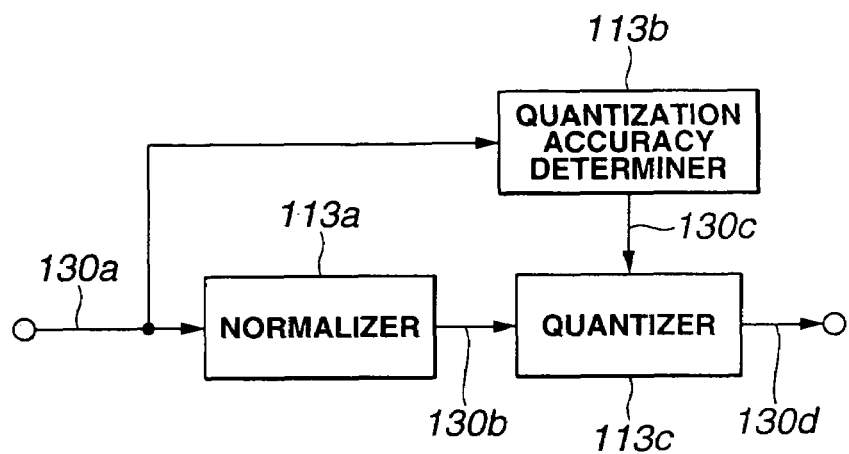
FIG. 4 is a schematic block diagram of a transform encoder devised according to the invention.

As shown in FIG. 4, in the signal component encoder 111b, each signal component 130a is normalized by normalizer 113a for each and every predetermined subband and the normalized signal 130b from the normalizer 113a is quantized by quantizer 113c according to the quantization accuracy information 130c that is computationally determined by quantization accuracy determiner 113b on the basis of the signal component 130a. Note that the signal components 130a correspond to the signal frequency components 110b of FIG. 2 and the output signal 130d of the quantizer 113c corresponds to the coded signal 110c of FIG. 2. Note, however, that the output signal 130d contains the normalization coefficient information obtained at the time of normalization and the above quantization accuracy information in addition to the quantized signal components.

Figure 5:
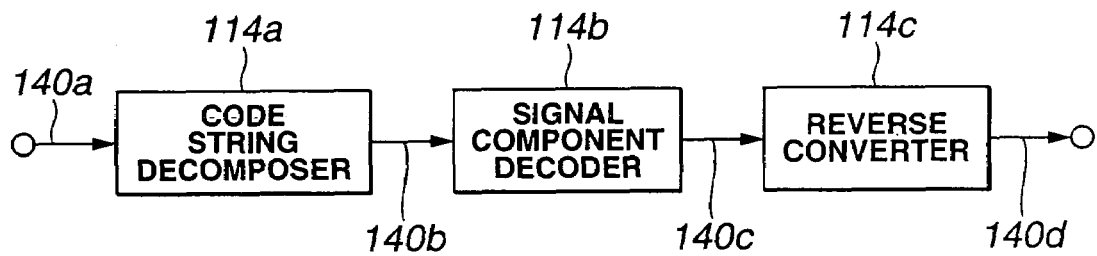
FIG. 5 is a schematic block diagram of a decoder devised according to the invention.

On the other hand, with an information decoding device adapted to reproduce an audio signal from a string of codes generated by the above described information coding device (decoder 73 in FIG. 1) for the purpose of the invention, as shown in FIG. 5, the code 140b of the signal component 140c is extracted from the string of codes 140a by code string decomposer 114a and a signal component 140c is restored from the code 140b by the signal component decoder 114b. Finally, the acoustic waveform signal 140d is reproduced form the restored signal components 140b by inverse converter 114c.

Figure 6:
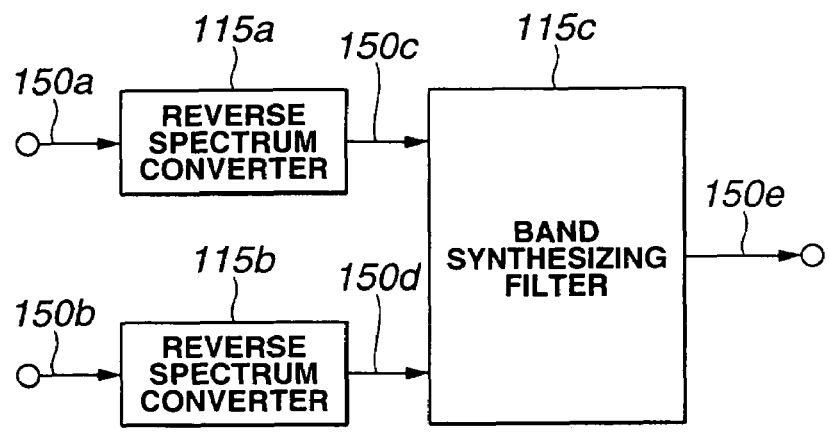
FIG. 6 is a schematic block diagram of an inverse transform encoder devised according to the invention.

The inverse converter 114c of the information decoding device has a configuration as shown in FIG. 6, which corresponds to that of the converter shown in FIG. 3. In the inverse converter 114c of FIG. 6, inverse spectrum converters 115a, 115b restore the signals of the respective subbands by conducting inverse spectrum transform on the respective input signals 150a, 150b fed to them and band synthesizing filter 115c synthetically combines the subband signals. Note that the input signals 150a, 150b corresponds to the signals 140c obtained by restoring the signal components by means of the signal component decoder 114b of FIG. 5 and the output signal 150e of the band synthesizing filter 115c corresponds to the acoustic waveform signal 140d of FIG. 5.

Figure 7:
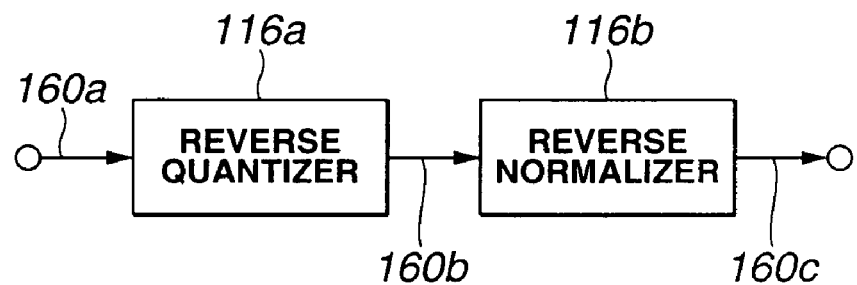
FIG. 7 is a schematic block diagram of a signal component decoder devised according to the invention.

The signal component decoder 114b of FIG. 5 has a configuration as shown in FIG. 7 and is adapted to perform inverse quantization and inverse normalization on code 140b, or spectrum signal, from the code string decomposer 114a of FIG. 5. In the signal component decoder 114b of FIG. 7, the inverse quantizer 116a inversely quantizes the input code 160a and the inverse normalizer 116b inversely normalizes the signal 160b obtained by inversely quantizing the input code 160a and outputs signal component 160c. Said code 160a corresponds to the code 140b from the code string decomposer 114a of FIG. 5 and said output signal component 160c corresponds to the signal component 140c in FIG. 5.

Figure 8:
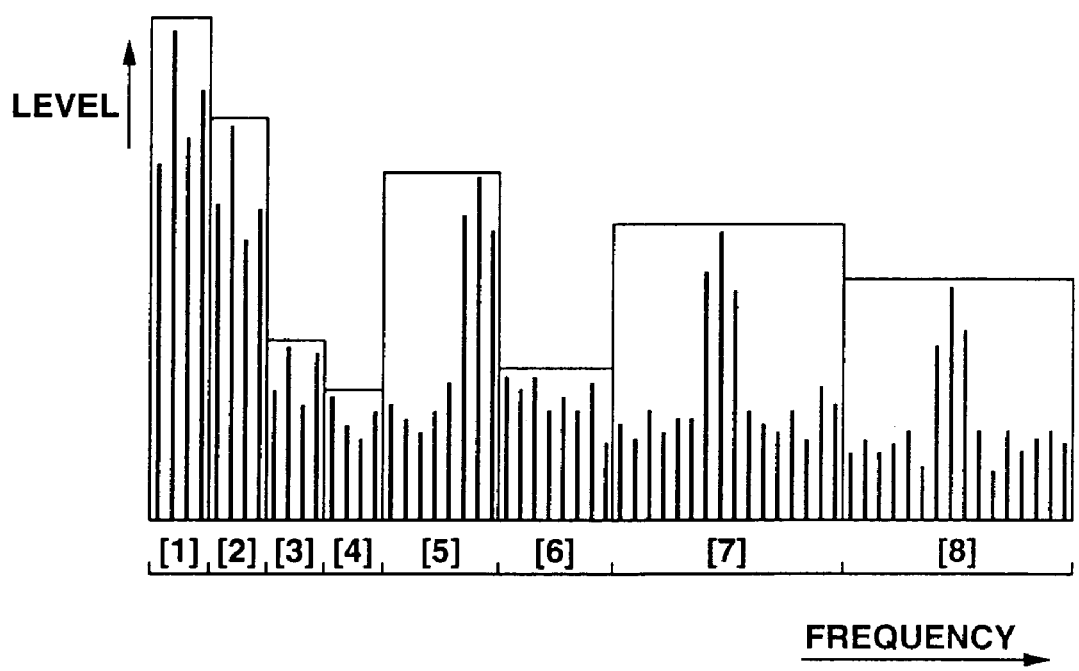
FIG. 8 is a schematic illustration of a basic coding method.

The spectrum signal obtained by the converter of the information coding device shown in FIG. 3 may typically have a form as shown in FIG. 8. Each of the spectrum components shown in FIG. 8 is obtained by converting the level of the absolute value of the corresponding spectrum component obtained by MDCT into [dB]. More specifically, with this information coding device, the input signal is converted into 64 spectrum signals for each and every predetermined transform block, which are then unitized into eight subbands [1] through [8] in FIG. 8 (hereinafter to be referred to as coding units) for normalization and quantization. It is then possible to perform an efficient coding operation that can minimize the degradation of sound quality as perceived by the auditory sense by differentiating the quantization accuracy as a function of the distribution pattern of the frequency components.

Figure 9:
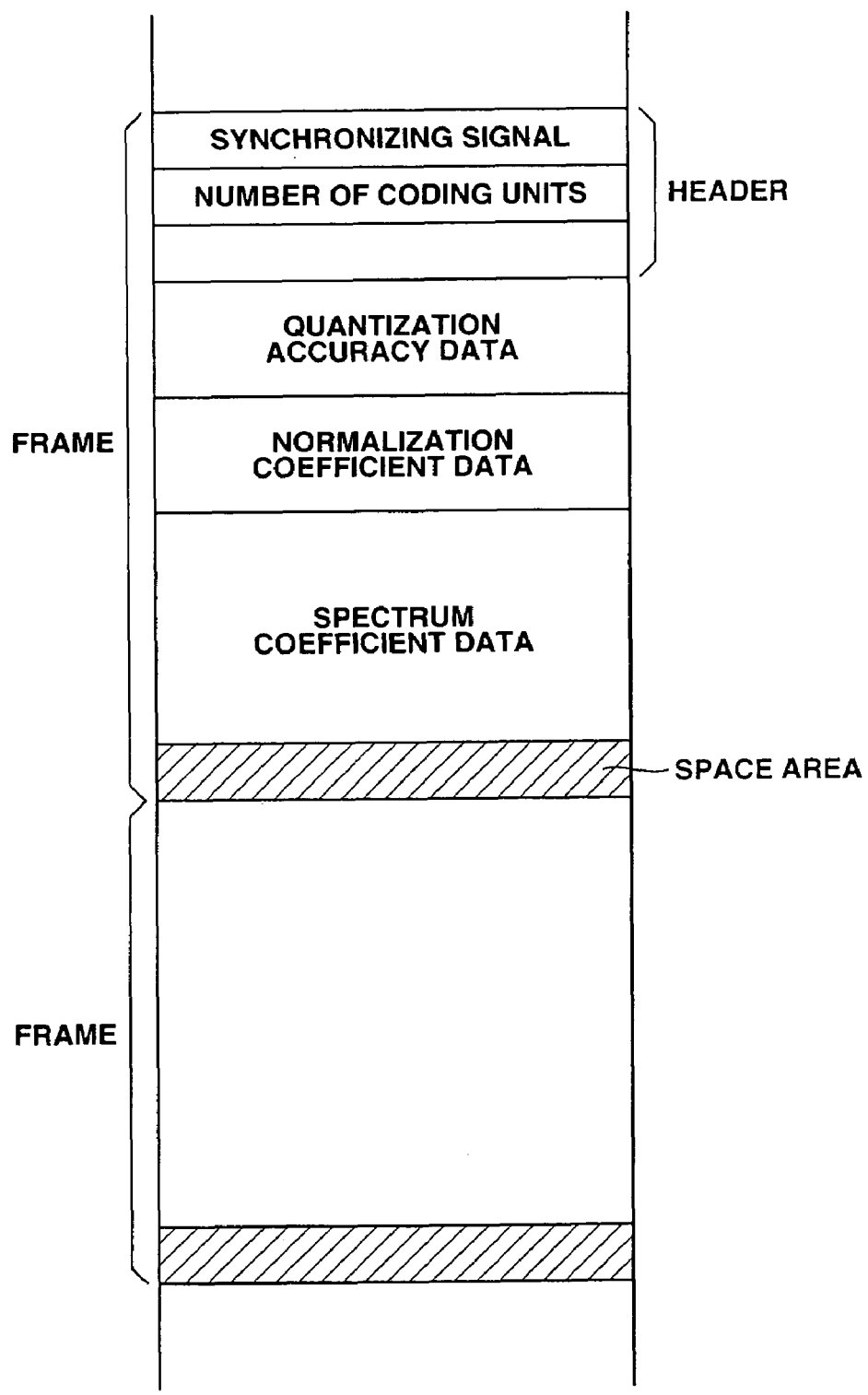
FIG. 9 is a schematic illustration of the configuration of a string of code of a frame coded by the basic coding method of FIG. 8.

FIG. 9 shows the configuration of a string of codes that can be obtained by the above coding method.

With this configuration of a string of codes, the data for restoring the spectrum signals of the transform blocks are coded and arranged as coded information to correspond to the frames that are formed by a predetermined number of bits. The synchronizing signal and the coded information obtained by coding the control data for the number of coding units and other data so as to be expressed in a predetermined number of bits are arranged at the top of each frame (header section) and then the coded information obtained by coding the quantization accuracy data of the coding units sequentially from the lower subband side and the coded information also obtained by coding the normalization coefficient data of the coding units sequentially from the lower subband side follow the header section, the information obtained by coding the spectrum coefficient data of the coding units that are normalized and quantized according to the normalization coefficient data and the quantization accuracy data sequentially from the lower subband side being arranged at the tail end.

The number of bits actually required to restore the spectrum signals of the transform blocks is determined as a function of the number of coding units used for the coding operation and the number of quantization bits used for the quantization accuracy information of the coding units and may vary from frame to frame. Only the number of bits required to restore the spectrum signals as counted from the top are significant and any remaining area of the frame is idle area and hence does not affect the reproduced signals. Normally, the idle area of each frame is minimized so as to effectively utilize as many bits and improve the sound quality.

With the arrangement of coding the transform blocks and making them correspond to a frame of a predetermined number of bits as in the case of the described example, the recorded position of any selected transform block on the recording medium can be computationally determined after recording the string of codes on the recording medium, which may be an optical disk, so that the recording medium can be randomly accessed to reproduce signals, starting from any desired spot.

Figure 10:
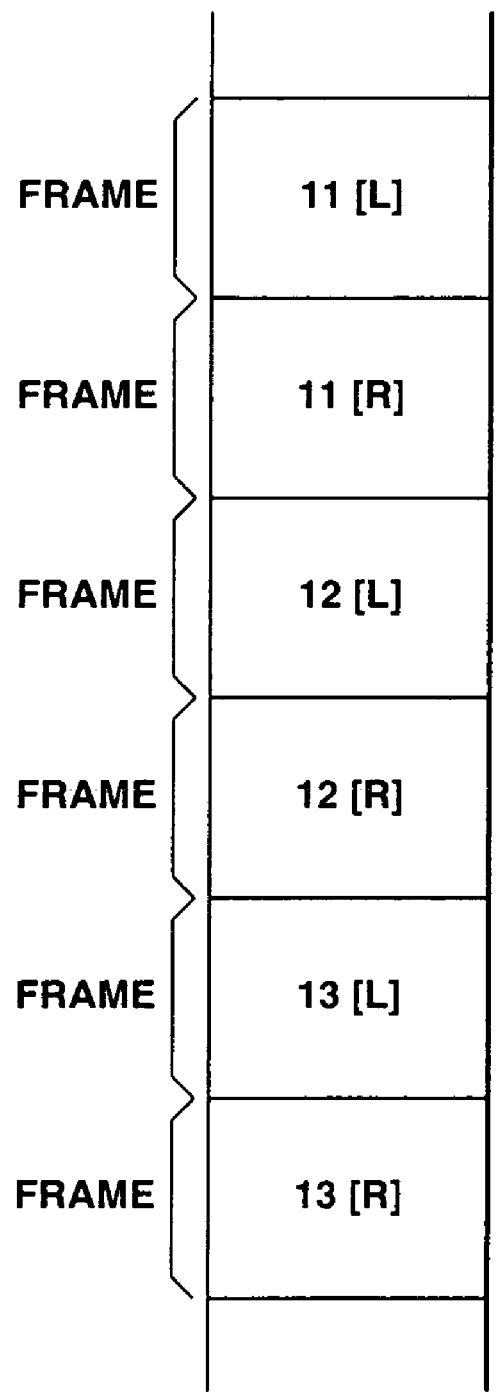
FIG. 10 is a schematic illustration of arrangement of L or R channel in every frame.
Figure 11:
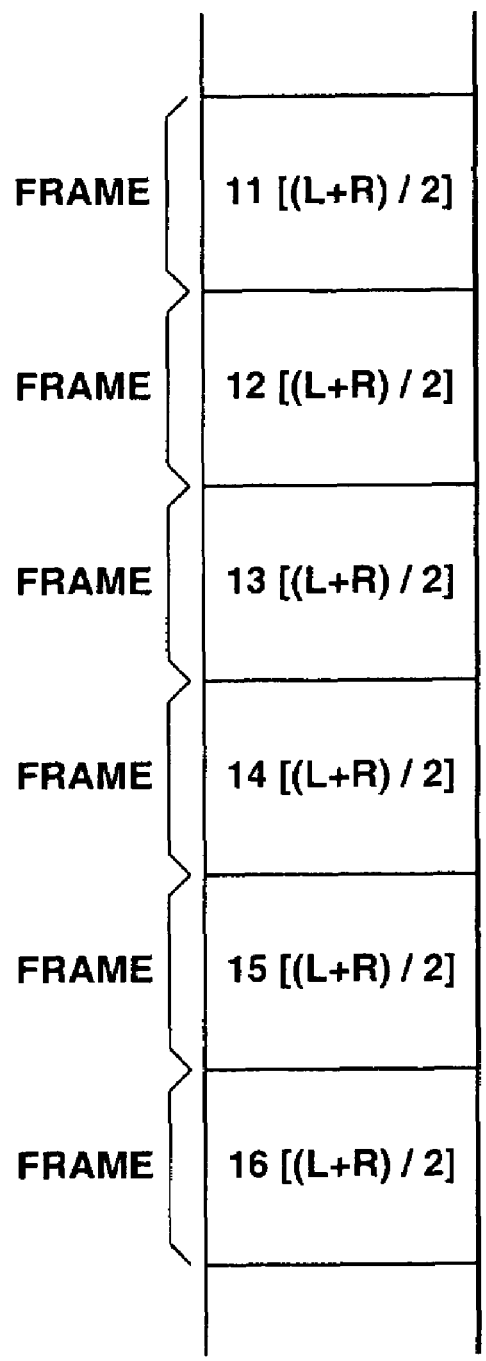
FIG. 11 is a schematic illustration of arrangement of a (L+R)/2 channel in every frame.

Each of FIGS. 10 and 11 illustrate a recording format that can be used for a time series arrangement of the data of frames as shown in FIG. 9. In FIG. 10, signals of two channels of L (left) and R (right) are arranged alternately on a frame by frame basis. In FIG. 11, signals of one channel obtained in the form of (L+R)/2 of L and R channels (monaural signals generated from the two channels of L and R) are sequentially arranged in respective frames.

Signals of two channels of L and R can be recorded on a same recording medium by using a recording format as shown in FIG. 10. On the other hand, twice as many signals as those of the recording format of FIG. 10 can be recorded and reproduced to double the recording time if the recording format of sequentially arranging signals of one channel obtained in the form of (L+R)/2 of L and R channels shown in FIG. 11 is used. Additionally the recording format of FIG. 11 is also advantageous in that it can be used with a simply configured reproduction circuit for sound reproduction.

If the recording format of FIG. 10 is referred to as standard time mode, the recording format of FIG. 11 that allows a long signal recording time with a single channel may be referred to as long time format because it doubles the recording time of the standard recording mode. With the recording format of FIG. 10, however, it is also possible to double the recording time when only one of the L and R channels is selected for one channel monaural recording. Then, this mode of operation may also be referred to as long time mode.

While only the coding technique of FIG. 9 is described above, it may be modified to enhance the coding efficiency.

For example, the coding efficiency can be improved by using a variable length coding technique of assigning a relatively small code length to quantized spectrum signals that appear frequently while assigning a relatively large code length to those that appear less frequently.

The quantization accuracy on the frequency base can be more delicately controlled and the coding efficiency can be improved by using a long temporal length for the predetermined transform blocks, or spectrum transform, when coding input signals because, with this arrangement, the quantity of the auxiliary information including the quantization accuracy information and the normalization coefficient information can be reduced per block and the frequency resolution can be improved.

Additionally, Japanese Patent Application Laid-Open No. 6-828633 filed by the applicant of the present patent application proposes in the specification and the drawings a method of isolating the tone-related signal components that are significant to the auditory sense from the remaining spectrum signal components and coding them separately. With this technique, a highly efficient coding operation can be realized with a high compression ratio without significantly degrading the audio signals to the ears.

Figure 12:
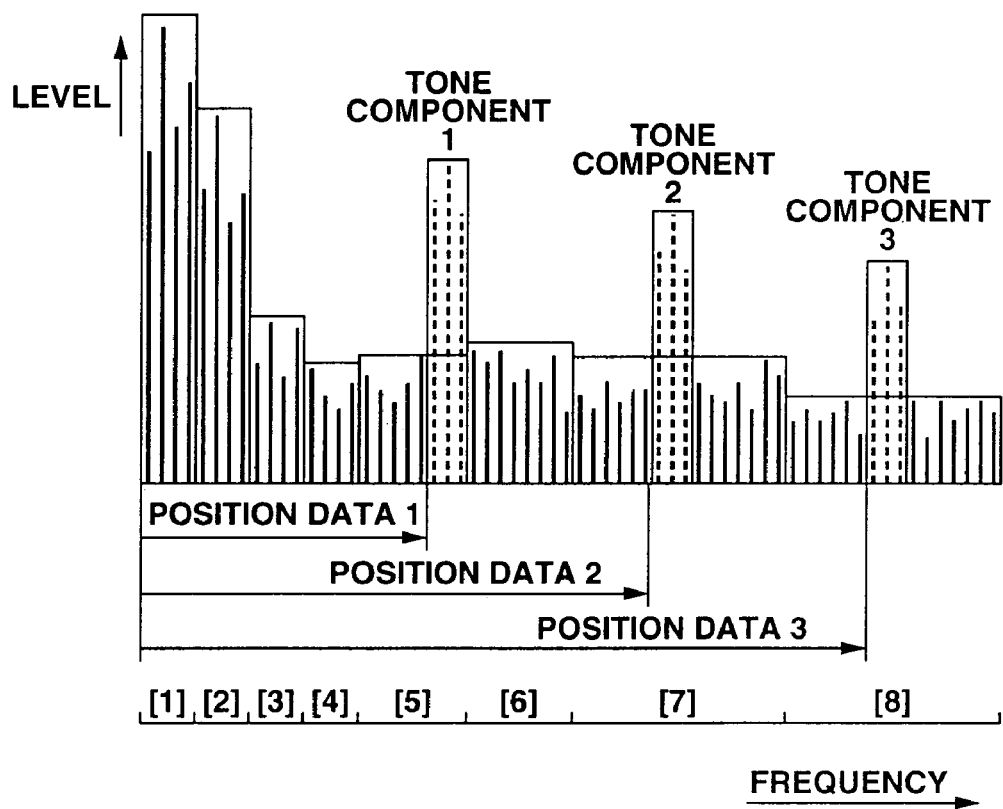
FIG. 12 is a schematic illustration of a coding method for dividing signal components into tone components and noise components for coding.

Now, the above method of isolating and coding tone-related signal components will be described by referring to FIG. 12. In FIG. 12, three tone components are isolated as tone-related signal components from the remaining spectrum signal components and the signal components of each of the tone components are coded with the positional data of the tone component on the frequency base.

Generally, to avoid degradation of sound quality, each of the signal components of each of the tone components where energy is concentrated on few spectrum components has to be quantized at a very high level of accuracy. However, after isolating the tone components, the spectrum coefficients (non-tone-related spectrum signal components) in each coding unit can be quantized with a relatively few number of steps without degrading the sound quality to the ears.

While only a relatively small number of spectrum signal components are shown in FIG. 12 for the purpose of simplification, in the case of actual tone components, energy is concentrated on several signal components in a coding unit that contains tens of several spectrum signal components. Therefore, the increase of data quantity that may result from the isolation of the tone components is insignificant and the overall coding efficiency can be improved by isolating the tone components.

Figure 13:
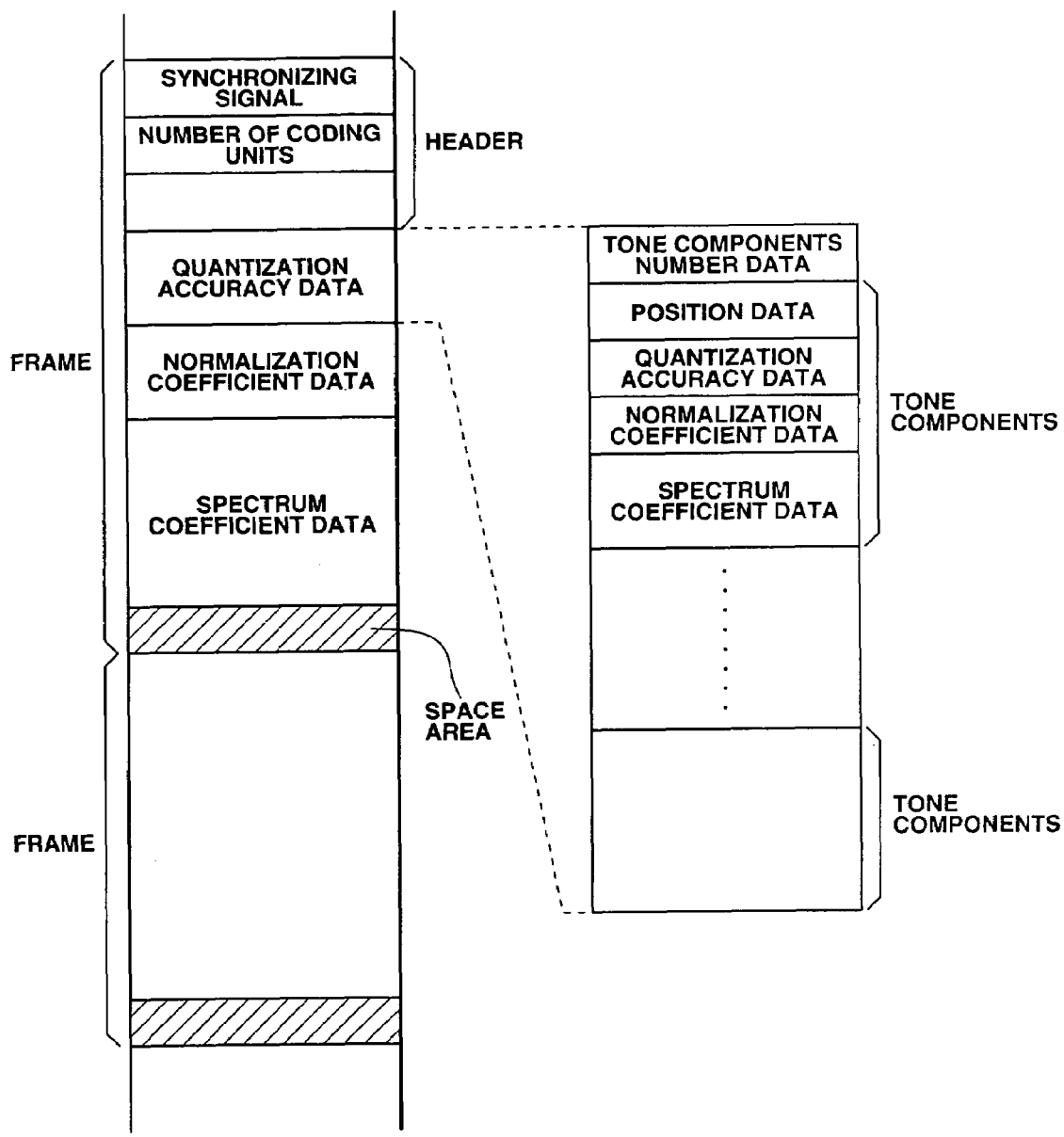
FIG. 13 is a schematic illustration of a string of codes encoded by the coding method of FIG. 12 for dividing signal components into tone components and noise components for coding.

FIG. 13 shows a string of codes that can be obtained by using the coding technique of FIG. 12. In this example, the synchronizing signal and the coded information obtained by coding the control data for the number of coding units and other data so as to be expressed in a predetermined number of bits are arranged in the header section and then the information obtained by coding the data on the tone components follows.

In the tone component data, the coded information on the number of signal components of each tone component is arranged first and followed by the information on the position of each tone component on the frequency base. Thereafter, the quantization accuracy information, the normalization coefficient information and the information obtained by coding each of the normalized and quantized tone-related signal components (spectrum coefficient data) are arranged.

After the tone component data, the information obtained by coding the data on the remaining signals left after isolating the tone-related signal components from the original spectrum signal components (which may be expressed as noise-related signal components) is arranged. This information includes the information obtained by coding the quantization accuracy data of the coding units sequentially from the lower subband side, the information also obtained by coding the normalization coefficient data of the coding units sequentially from the lower subband side follow the header section and the information obtained by coding the spectrum coefficient data (the signal components other than the tone components) of the coding units that are normalized and quantized according to the normalization coefficient data and the quantization accuracy data sequentially from the lower subband side being arranged at the tail end. Note that the spectrum signal components (coefficient data) including the tone-related signal components and other signal components are coded for variable length coding.

Figure 14:
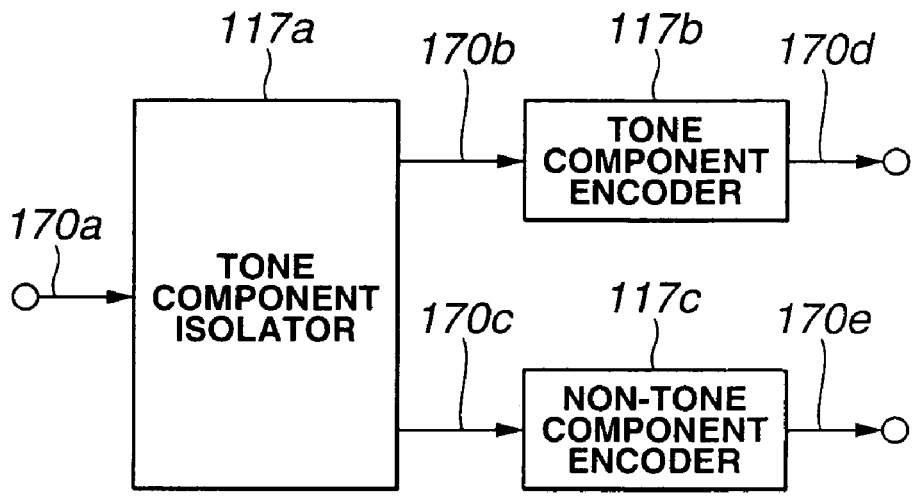
FIG. 14 is a schematic block diagram of a signal component encoder for dividing signal components into tone components and noise components for coding.

FIG. 14 is a schematic block diagram showing a possible configuration of the signal component encoder 111$b$ of FIG. 2 that can be used for isolating the tone-related signal components from the remaining signal components.

Referring to FIG. 14, the signal component 170$a$ (110$b$) fed from the converter 111$a$ of FIG. 2 is sent to tone component isolator 1117 of the signal component encoder 111$b$. The signal component 170$a$ is then divided into a tone-related signal component and the remaining signal component (a non-tone-related signal component), of which the tone-related signal component 170$b$ is sent to tone component encoder 117$b$ while the non-tone-related signal component 170$c$ is sent to non-tone component encoder 117$c$. The tone component encoder 117$b$ and the non-tone component encoder 117$c$ encode the respective signal components fed to them and produce the respective outputs 170$d$, 170$e$. Note that the tone component encoder 117$b$ generates the above listed information items that constitute the tone component data of FIG. 13 in addition to the operation of coding the tone-related signal component. The configuration of the tone component encoder 117$b$ and the non-tone component encoder 117$c$ is same as that of the circuit of FIG. 4 in terms of signal coding.

Figure 15:
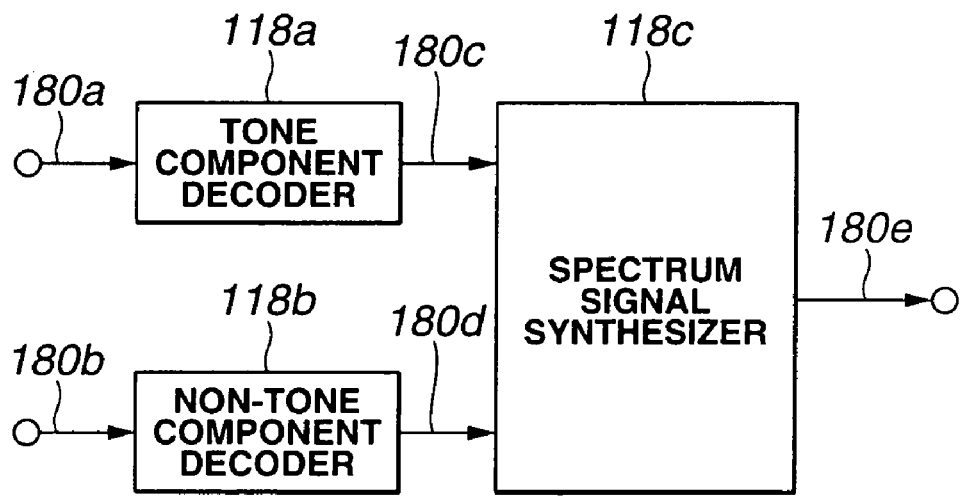
FIG. 15 is a schematic block diagram of a signal component decoder for dividing signal components into tone components and noise components for decoding a coded signal.

FIG. 15 is a schematic block diagram showing a possible configuration of the signal component decoder 114$b$ of FIG. 5 that can be used when the tone-related signal components are isolated from the remaining signal components.

Referring to the signal component decoder 114$b$ of FIG. 15, the code 140$b$ sent from the code string decomposer 114$a$ includes a tone component data 180$a$ and a non-tone-related signal component 180$b$ and the data and the signal component are respectively sent to tone component decoder 118$a$ and non-tone component decoder 118$b$. The tone component decoder 118$a$ decodes the tone-related signal component from the tone component data as shown in FIG. 13 and outputs the obtained tone-related signal component 180$c$. On the other hand, the non-tone component decoder 118$d$ decodes the non-tone related signal component and outputs the obtained non-tone related signal component 180$d$. The tone-related signal component 180$c$ and the non-tone-related signal component 180$d$ are then sent to spectrum signal synthesizer 118$c$. The spectrum signal synthesizer 118$c$ synthetically combines the tone-related signal component and the non-tone-related signal component according to the position data and outputs the obtained signal component 180$e$. Note that the configuration of the tone component decoder 118$a$ and the non-tone component decoder 118$b$ is same as that of the circuit of FIG. 7 in terms of signal decoding.

Figure 16:
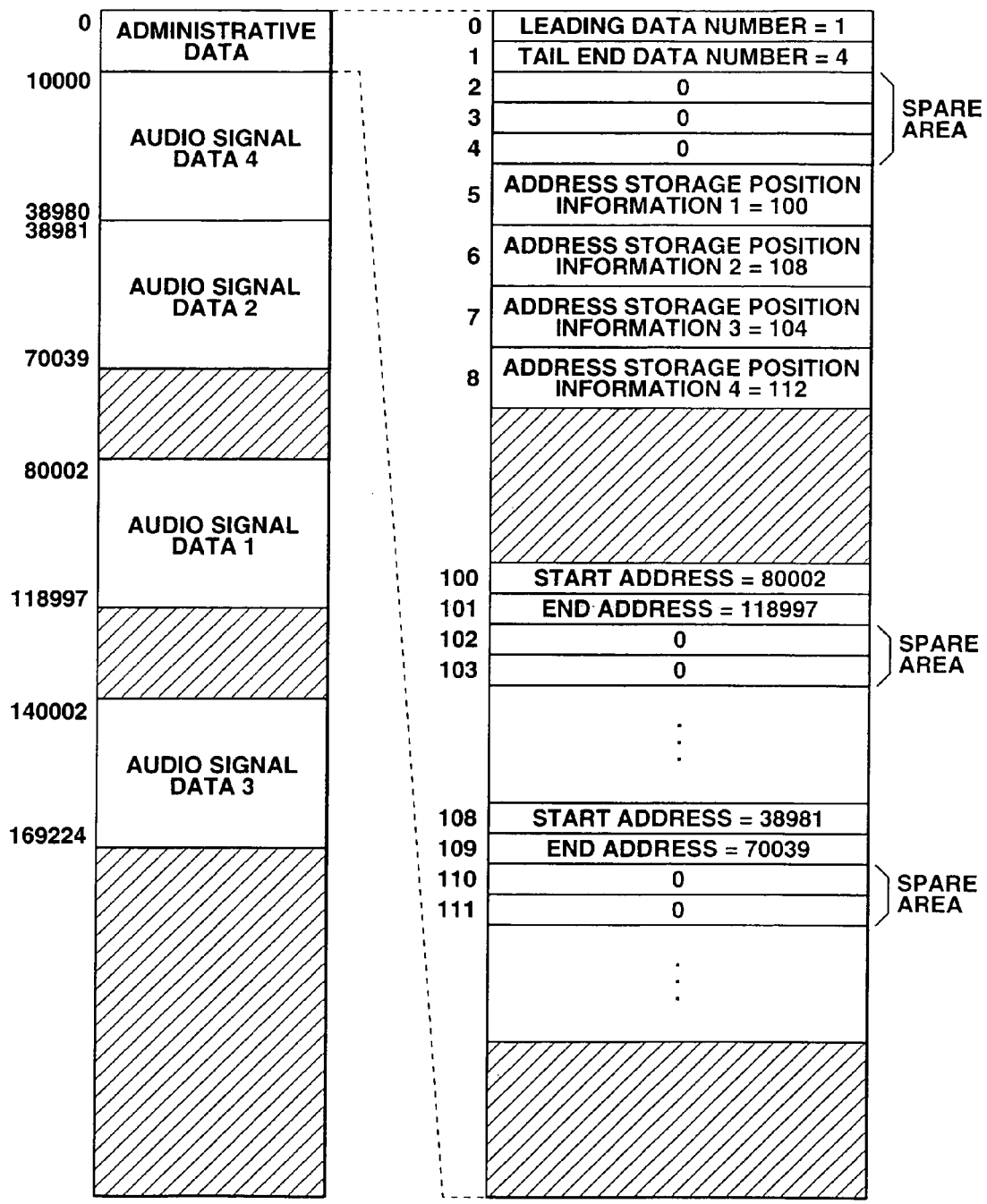
FIG. 16 is a schematic illustration of a recording format that can be used when recording the string of codes of A codec.

FIG. 16 shows a format that can be used for recoding coded signals on a magneto-optic disk. Note that, in the instance of FIG. 16, the audio signals of a total of four tunes including audio signal data 1, 2, 3 and 4 are recorded on the magneto-optic disk.

Referring to FIG. 16, the audio signal data of the four tunes are recorded on the magneto-optic disk along with the management data to be used when recording or reproducing the audio signal data. The top data number is recorded on address 0 of the management data area, whereas the tail end data number is recorded on address 1 of the management data area. In the instance of FIG. 16, 1 is recorded as the value of the top data number and 4 is recorded as the value of the tail end data number. Thus, it is seen from the top data number and the tail end data number that a total of four sets of audio signal data including audio signal data 1 through audio signal data 4 are recorded on the magneto-optic disk.

Address 5 through address 8 of the management data area stores "the data showing the positions where the audio signal data 1 through 4 are respectively recorded on the disk", or the information on the address storing positions where the respective pieces of address information are stored in the management data area. The pieces of information on the address storing positions are recorded in the sequence of replaying the audio signal data (the tunes). More specifically, the information on the address storing position for the first audio signal data that is reproduced firstly is stored at address 5 and the information on the address storing position for the second audio signal that is reproduced secondly is stored at address 6 and so on. In other words, in the instance of FIG. 16, it is found from the information on the address storing position at address 5 that the address storing position of the audio signal data that is reproduced firstly is address 100. Additionally, it is found from the value of address 100 that the start address and the end address of the audio signal data that is reproduced firstly are respectively 80002 and 118997. Similarly, it is found from the information on the address storing position at address 6 that the address storing position of the audio signal data that is reproduced secondly is address 108. Additionally, it is found from the value of address 108 that the start address and the end address of the audio signal data that is reproduced secondly are respectively 38981 and 70039. It will be understood that, by using the management data, the order of reproduction of the first audio signal data and the second audio signal data can be inverted easily by interchanging the data at address 5 and the data at address 6 instead of interchanging the positions of recoding the respective audio signal data.

The magnetic data area contains spare areas to allow expansions in the future and 0 data is stored in the spare areas. In this instance, areas of address 2 through address 4, address 102, address 103, address 110 and address 111 of the management data area are spare areas.

Assume now that a coding technique (to be referred to as A codec, old standards or first coding technique hereinafter) is developed and standards for the format of recording signals on the disk are established. Assume also that thereafter a more efficient coding technique (to be referred to as B codec, new standards or second coding technique hereinafter) is developed by expanding A codec. Then, signals coded by B codec can be recorded on a disk of a same type where signals coded by A codec can be recorded. As both signals coded by B codec and those coded by A codec can be recorded on a same disk, it will now be possible to record signals for a longer period of time and/or signals of higher sound quality to consequently expand the applicability of disks to a great convenience of users.

If the coding technique described above by referring to FIG. 9 is A codec, then the variable length coding technique of assigning a relatively small code length to quantized spectrum signals that appear frequently while assigning a relatively large code length to those that appear less frequently can be considered to be B codec. Or, the coding technique of using a relatively large transform block length when coding input signal so as to relatively reduce the quantity of the auxiliary information including the quantization accuracy information and the normalization coefficient information per block may be considered to be B codec. Alternatively, the coding technique of isolating the tone components from the non-tone components out of spectrum signal components and coding them separately may be considered to be B codec. Furthermore, a combination of any of the above high efficiency coding techniques may be considered to be B codec.

Figure 17:
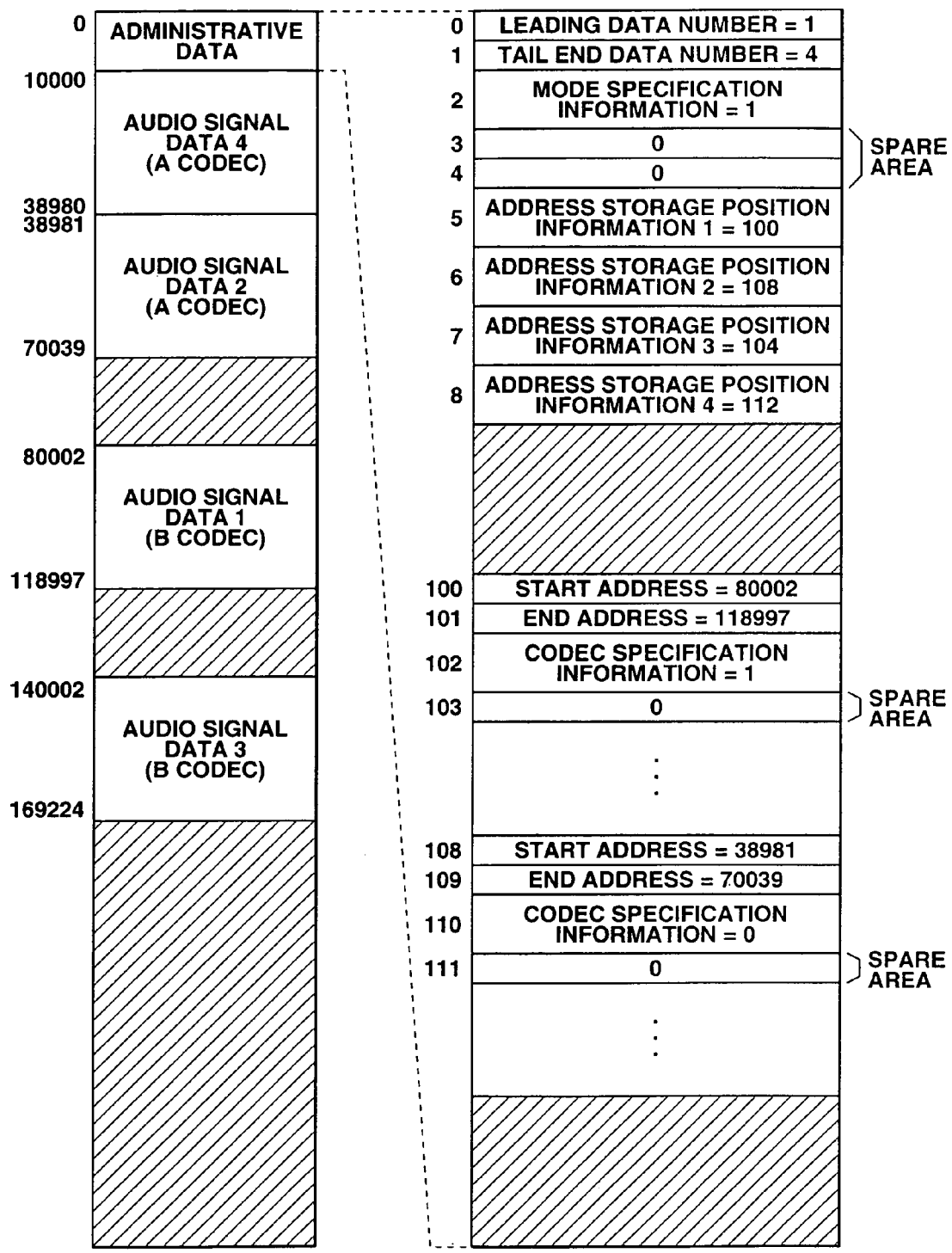
FIG. 17 is a schematic illustration of a recording format that can be used when recording the string of codes of A codec and that of B codec.

When recording signals coded by means of B codec obtained by expanding A codec, mode specifying information as shown in FIG. 17 will be recorded at address 2 that is a spare area on the disk adapted only to the old standards (A codec) as shown in FIG. 16. The mode specifying information indicates that the signals conforming to the old standards (A codec) are recorded when its value is equal to 0 and that the signals conforming to A codec or B codec are recorded when its value is equal to 1. Therefore, the user can recognize that the disk carries signals conforming to B codec when the mode specifying information shows a value of 1 at the time of replaying the disk.

When recording signals coded by means of B codec, one of the spare areas arranged next to the area for recording the address information (start address and end address) of each audio signal data as shown in FIG. 16 is used as area for the codec specifying information. The mode specifying information indicates that the signals conforming to the old standards (A codec) are recorded when its value is equal to 0 and that the signals conforming to the new standards (B codec) are recorded when its value is equal to 1. Thus, both audio signal data coded according to A codec and those coded according to B codec can be recorded on a same disk and the disk can be replayed by means of an apparatus (to be referred to as apparatus adapted to the new standards) conforming to the new standards (B codec).

However, as shown in FIG. 17, if a disk carries both data according to A codec and those according to B codec, it is difficult to tell so from appearance and therefore the user may be confused in finding out if it carries data according to A codec or data according to codec B. Then, the user can replay the disk with an apparatus adapted to the old standards. Then, the apparatus adapted to the old standards misunderstands that all the signals recorded on the disk conform to A codec and tries to reproduce the signals as such without checking the information stored at address 2 that always shows a value of 0 when conforming to the old standards. Therefore, there can possibly be cases where the apparatus cannot reproduce the desired signals or generates harsh and random noises to confuse the user.

In view of this problem, the applicant of the present patent application proposes in the specification and the drawings of Japanese Patent Application Laid-Open No. 10-302405 a technique with which, when both signals coded according to A codec (the old standards) and those coded according to B codec (the new standards) are recorded on a same disk, the signals according to A codec can be reproduced by an apparatus adapted to the old standards while an apparatus adapted to the new standards can reproduce any signals recorded on the disk regardless if they are coded according to A codec or B codec and, additionally, the risk of gradation of signal quality that can arise by recording signals coded according to different standards can be alleviated. When signals according to old standards (A codec) and those according to the new standards (B codec) are recorded on a same disk, the storage area allocated to each type of signals is inevitably reduced so that consequently it may be difficult to maintain the quality level of signals when they are reproduced. However, the technique disclosed in the specification and the drawings of Japanese Patent Application Laid-Open No. 10-302405 can also alleviate the degradation of sound quality.

More specifically, with the technique disclosed in the specification and the drawings of Japanese Patent Application Laid-Open No. 10-302405, while it is so arranged in advance that a long signal recording or reproduction time is allowed to a string of codes when recording signals in the recording format of FIG. 11 or monaural signals in the recording format of FIG. 10, a number of bits that is smaller than the total number of bits that can be assigned to each frame is actually assigned to the small number of channel(s) if a reduced number of channel(s) is used. Differently stated, with the technique of Japanese Patent Application Laid-Open No. 10-302405, a number of bits smaller than the total number of bits that can be assigned to each frame is actually assigned for coding signals with A codec in order to produce idle recording areas in the frames. Then, signals of the channel(s) that the apparatus adapted to the old standards cannot reproduce, or signals coded according to B codec, are recorded in the obtained spare areas of the frames to make it possible to realize multi-channel recording/reproduction (recording/reproduction of both signals coded according to A codec and those coded according to B codec) in the long time mode. Note that idle storage areas may alternatively be produced by reducing the channel bandwidth to be used for coding by means of the coding method of A codec in order to squeeze out bits out of the assigned bits.

When signals of A codec and those of B codec are coded with a number of bits smaller than the number of bits that can be assigned to each frame in a manner as described above, the number of bits assigned to the coding of the signals of A codec is reduced by definition if compared with the case where all the bits of each frame are assigned to the coding of the signals of A codec. The net result will be a degraded sound quality that arises when signals are reproduced by an apparatus adapted to the old standards.

However, with the technique proposed in Japanese Patent Application Laid-Open No. 10-302405, the number of bits to be used for coding signals according to B codec is relatively reduced if compared with the coding of signals according to A codec because the coding efficiency is improved typically by using a large transform block length for B codec so that an increased number of bits can be used for A codec to alleviate the above identified problem of degraded sound quality.

In other words, with the technique of Japanese Patent Application Laid-Open No. 10-302405, the possible degradation of sound quality due to the reduction in the number of bits assigned to the signals to be reproduced by an apparatus that is adapted to the old standards as a result of the use of a multi-channel system is minimized by coding the signals of the channel that is not used by an apparatus adapted to the old standards for reproduction more efficiently than the signals (of A codec) of the channel that is used by an apparatus adapted to the old standards.

Techniques for improving the coding efficiency include that of using a large transform block length, that of using variable length codes, that of isolating tone-related signal components and so on. The use of a large temporal transform block length, the use of variable length codes and the isolation of tone-related signal components will be discussed below for the purpose of simplification.

Figure 18:
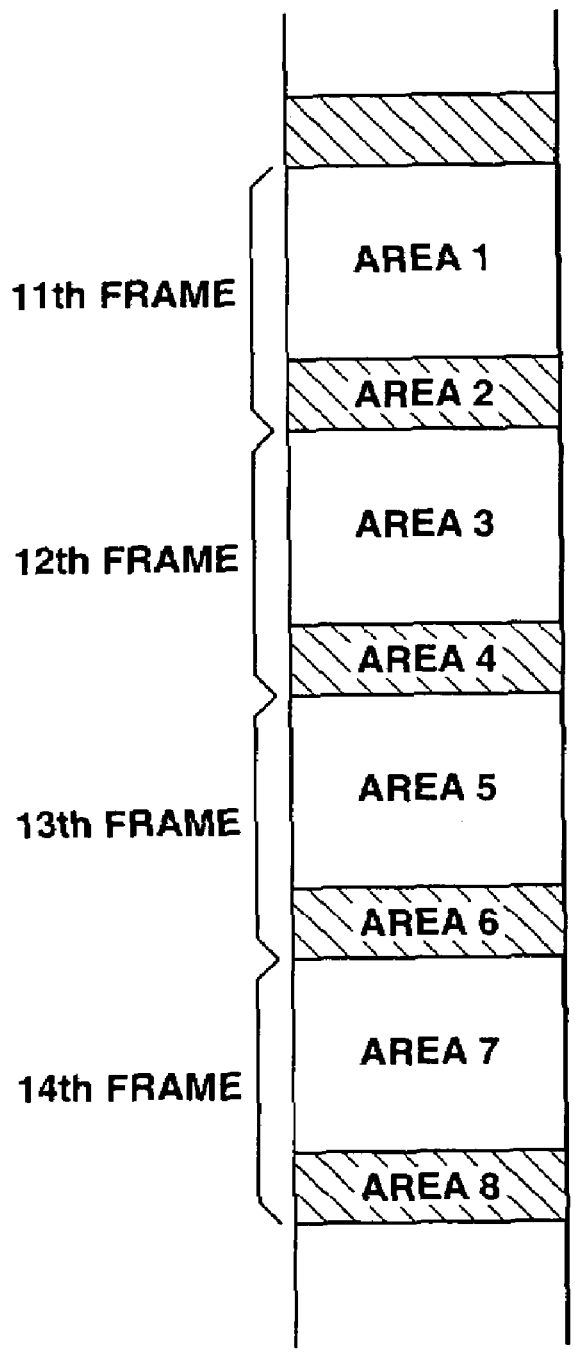
FIG. 18 is a schematic illustration of the configuration of a string of codes that can be obtained when arranging signals of A codec and B codec in frames.

FIG. 18 shows a string of codes that can obtained by using the above technique for the purpose of coding.

Referring to FIG. 18, each of the frames comprising a predetermined number of bits is divided into two areas and area 1 and area 3 store signals of (L+R)/2 channel that are coded by the coding method of A codec, whereas area 2 and area 4 that are shaded in FIG. 18 store signals of (L−R)/2 channel that are coded by the coding method of B codec. The area 2 and the area 4 correspond to idle areas.

Note that the coding method of A codec may be the one described by referring to FIG. 9, whereas the coding method of B codec may be the one described by referring to FIG. 13 that is used for coding the signals transformed into spectrum signal components with the transform block length that is twice as long as that of A codec. Note that, since the transform block length of B codec is twice of its counterpart of A codec, the codes corresponding to the transform blocks of B codec are recorded across two frames.

In the instance of FIG. 18, a coding method that uses a fixed transform length is employed as the coding method of A codec and therefore the number of bits used by the string of codes obtained by the coding method of A codec (to be referred to as A codec code string hereinafter) can be calculated with ease. Then, because the number of bits used by the A codec code string can be calculated, the top position of the string of codes obtained by the coding method of B codec (to be referred to as B codec code string hereinafter) can easily be found out. Alternatively, it may be so arranged that the B codec code string starts from the last part of the frame. With such an arrangement, the top position of the B codec code string can be known with ease even if a variable length coding method is used for B codec. When the top position of the B codec code string is easily known by calculation, an apparatus adapted to both A codec and B codec (and hence to the new standards) can process two different code strings quickly in parallel to realize fast processing.

When the coding method of A codec involves the use of the information on the number of coding units as described above by referring to FIG. 9, the quantization data and the normalization coefficient data can advantageously be omitted at the high subband side by reducing the channel bandwidth to be used for coding by means of the coding method of A codec to squeeze out storage areas for recoding signals of other channels (idle storage area) in a manner as described earlier. With this arrangement again, the number of bits used by the coding method of A codec can be easily calculated.

In the instance of FIG. 18, signals of (L+R)/2 channel are stored as A codec code string and signals of (L−R)/2 channel are stored as B codec code string. Therefore, (L+R)/2 monaural signals can be reproduced by decoding the signals of the storage areas for storing only A codec signals. On the other hand, the signals of the R (right) channel can be generated by reproducing and decoding the signals stored in the storage areas for A codec signals and those stored in the storage areas for B codec signals and determining the sum of them and the signals of the L (left) channel can be generated by determining the difference of them for stereo signal reproduction.

In the case of an information recording medium carrying code strings as shown in FIG. 18, an apparatus adapted to the old standards ignores the areas storing signals coded by the coding method of A codec so that monaural signals will be reproduced from the information recording medium. On the other hand, an apparatus provided with both a decoder for decoding codes encoded by the coding method of A codec and a decoder for decoding codes encoded by the coding method of B codec (and hence adapted to the new standards) can reproduce stereo signals from the information recording medium. Thus, if the coding method of FIG. 18 conforming to the new standards is introduced along with apparatus adapted to the new standards for stereo signal reproduction into the market where apparatus adapted to the old standards are dominant, the latter can still be used for monaural signal reproduction. Since a decoder for decoding codes of A codec is normally a small piece of hardware and not expensive, an apparatus comprising such a decoder can be manufactured relatively at low cost.

When it is so arranged in advance that a long signal recording or reproduction time is allowed to a string of codes when recording monaural signals, the above described technique allows an apparatus adapted to the old standards to reproduce A codec signals (signals according to the old standards) with a reduced number of channel(s) while allowing an apparatus adapted to the new standards to reproduce multi-channel signals for a prolonged period of time. Additionally, when it is so arranged in advance that a standard recording or reproduction time (e.g., a half of the above long recording or reproduction time) is allowed to a string of codes for multi-channel, the above technique can also be applied to occasions where A codec signals are reproduced in a multi-channel mode by an apparatus adapted to the old standards and B codec signals are also reproduced in a multi-channel mode for the standard recording or reproduction time by an apparatus adapted to the new standards.

For instance, referring again to FIG. 18, if A codec L (left) channel signals are recorded as string of codes in area 1 and B codec L (left) channel signals are recorded as string of codes in areas 2 and 6, whereas A codec R (right) channel signals are recorded as string of codes in area 3 and B codec R (right) channel signals are recorded as string of codes in areas 4 and 8, both an apparatus adapted to the old standards and an apparatus adapted to the new standards can reproduce signals for stereophonic operation. Note that the transform block length of B codec is made twice as large as that of A codec in order to enhance the coding efficiency of B codec relative to A codec, the codes corresponding to the transform blocks of B codec are recorded across two frames.

As described above, with the method disclosed in Japanese Patent Application Laid-Open No. 10-302405 filed by the applicant of the present patent application, an apparatus adapted to the new standards can be provided with additional values while allowing an apparatus adapted to the old to properly reproduce signals.

However, various problems can arise to bewilder the user when an information recording medium carries both strings of codes recorded by an apparatus adapted to the new standards and those recorded by an apparatus adapted to the old standards in a mixed state and the recording medium is operated by the apparatus adapted to the old standards for editing (e.g., splitting, combining, moving or erasing strings of codes).

More specifically, as discussed above, while management data (so-called TOC) including track replay mode information, start address information and end address information have to be stored in the management data area of the recording medium defined by the old standards so that they may be referred to by an apparatus adapted to the old standards, data on the additional information (extended information) such as the information on the replay mode adapted to the new standards and necessary for an apparatus adapted to the new standards to reproduce value-added data have to be stored in an area (extended management data area) that can be referred to only by an apparatus adapted to the new standards so that they by not be referred to nor erased by an apparatus adapted to the old standards. Then, assume here that apparatus adapted to the new standards can accommodate both mode a and mode c while apparatus adapted to the old standards can accommodate only mode a and the signals stored in an information recording medium are adapted to both the features of mode a and those of mode c. Also assume that the above signals are divided into two parts by using the editing feature of the apparatus adapted to the old standards and the replay mode information for the signals of the latter part is stored in mode a in the management data area of the information recording medium provided for the old standards. Then, if the information recording medium is replayed by the apparatus adapted to the new standards, the signals stored in the information recording medium can be reproduced only in mode a adapted only to the old standards, although they are actually signals (code string) adapted to both the features of mode a and those of mode c. In such a case, the quality of the signals are no longer maintained and the user of the apparatus adapted to the new standards will be very confused. Furthermore, assume that the signals stored in the information recording medium are adapted to both the features of mode a and those of mode c and signals adapted to both mode a and mode c are stored in the extended management data area for the new standards. Also assume that the above signals are erased by an apparatus adapted to the old standards and additional signals are recorded by the apparatus adapted to the old standards in mode a. Then, extended replay mode information indicating that signals adapted to both mode a and mode c is left unerased in the extended management data area for the new standards on the information recording medium. Therefore, when the information recording medium is replayed by an apparatus adapted to the new standards, the apparatus will wrongly recognize that the signals stored on the information recording medium are those adapted to both mode a and mode c on the basis of the extended replay mode information left unerased in the extended management data area. Then, in the worst case, the apparatus adapted to the new standards can run away to terribly degrade the signal quality and confuse the user.

In view of these problems, according to the invention, when strings of codes that are to be reproduced in different reproduction modes are recorded on a same disk, a technique according to the invention which will be described below is used to allow an apparatus adapted to the old standards can reproduce signals from the areas adapted to the old standards but prohibited from doing any other operations such as additional signal recording, editing and erasing.

Figure 19:
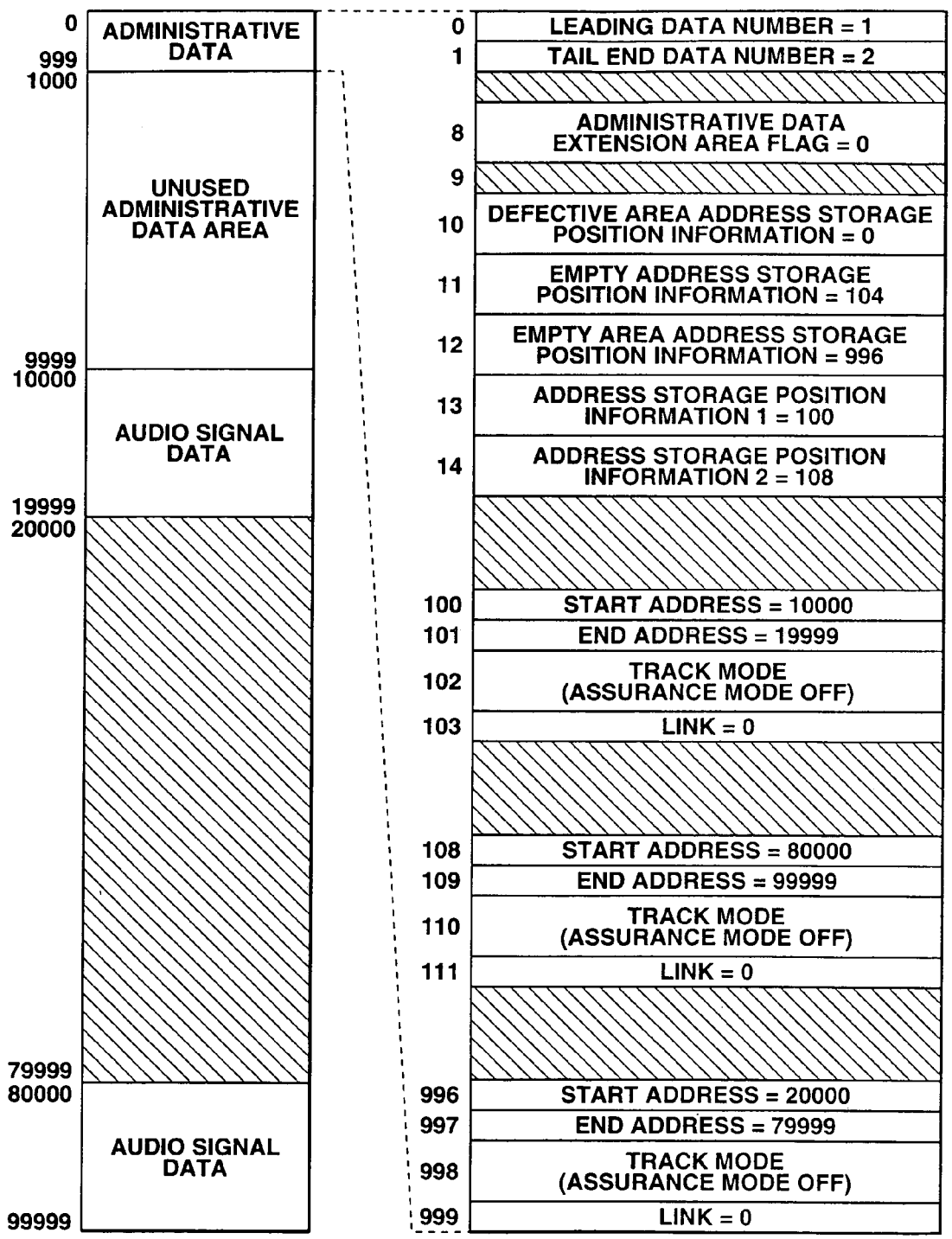
FIG. 19 is a schematic illustration of a recording format that can be used when recording a string of codes by means of an apparatus adapted to a set of old standards.

FIG. 19 shows a format of arranging a management data area and areas (data areas) storing coded signals on a recording medium that an apparatus adapted to the old standards may refer to. This format may typically be used when recording coded signals (audio signal data) on a magneto-optic disk. Assume here that audio signal data of two tunes are recorded on the disk and they include the signal data of one of the tunes recorded at address 10000 through address 19999 and those of the other tune recorded at address 80000 through address 99999.

Referring to FIG. 19, the disk carries, in addition to the audio signal data of the two tunes, management data to be used for recording and reproducing the audio signal data.

The management data that an apparatus adapted to the old standards can refer to are recorded in management data area from address 0 to address 999 and the area from address 1000 to address 9999 is unused management data area that an apparatus adapted to the old standards cannot refer to. The top data member is stored at address 0 of the management data area and the tail end data number is stored at address 1 of the data area. In the instance of FIG. 19, 1 is stored as the value of the top data number and 2 is stored as the value of the tail end data number. Thus, it can be seen from the top data number and the tail end data number that two audio signal data including the first audio signal data and the second audio signal data are recorded on the disk.

Address 13 through address 14 of the management data area stores "the data showing the positions where the audio signal data are respectively recorded on the disk", or the information on the address storing positions where the respective pieces of address information are stored in the management data area. The pieces of information on the address storing positions are recorded in the sequence of replaying the audio signal data (the tunes). More specifically, the information on the address storing position for the first audio signal data that is reproduced firstly is stored at address 13 and the information on the address storing position for the second audio signal that is reproduced secondly is stored at address 14. In other words, in the instance of FIG. 1-9, it is found from the information on the address storing position at address 13 that the address storing position of the audio signal data that is reproduced firstly is address 100. Additionally, it is found from the value of address 100 that the start address and the end address of the audio signal data that is reproduced firstly are respectively 10000 and 19999. Similarly, it is found from the information on the address storing position at address 14 that the address storing position of the audio signal data that is reproduced secondly is address 108. Additionally, it is found from the value of address 108 that the start address and the end address of the audio signal data that is reproduced secondly are respectively 80000 and 99999. It will be understood that, by using the management data, the order of reproduction of the first audio signal data and the second audio signal data can be inverted easily by interchanging the data at address 13 and the data at address 14 instead of interchanging the positions of recoding the respective audio signal data.

In the instance of FIG. 19, the address information is handled as a unit an includes the start addresses and the end addresses as well as the mode information (to be referred to as track mode hereinafter) and link information (to be referred to as link pointer hereinafter) for the signals in each of the areas indicated by a start address and an end address (the unit or its recording areas may be called as a slot(s)). As track mode, the number of audio channels (e.g., the number of channel(s) for monaural signals or stereo signals) of the recording areas, the flag indicating if digital signals are recorded or not, and the rewrite protection flag are stored. The link pointer is typically used when a tune is recorded in two areas that are physically remote from each other so that it links to the areas that are physically remote from each other so that it links the areas to restore the tune and stores information on the address storing positions. If there is no need of link, 0 will be recorded.

Information on the idle address storing positions is stored at address 11 of the management data area as information showing the top of each idle slot. Idle slots are connected to each other by means of the link arranged in each slot and the link of the last slot is made equal to 0. Information on idle area address storing positions is stored at address 12 of the management data area. In other words, they represent the slots where the addresses of the idle areas (unused areas) on the disk. When a plurality of idle areas exist on the disk, they are connected by means of the link arranged in each slot. If the number of recordable areas on the disk is found to be less than the number of areas that the recording apparatus can use or equal to 0, the information on idle area address storing positions is made equal to 0.

In the instance of FIG. 19, the management data extension flag is stored at address 8 of the management data area and information on defective area address storing positions is stored at address 10 of the management data area. In the case of this example, 0 is stored at address 8 for the management data extension flag and also 0 is stored at address 10 for the information on defective area storing positions. The management data area includes spare areas to allow expansions in the future and 0 data are stored there.

Figure 20:
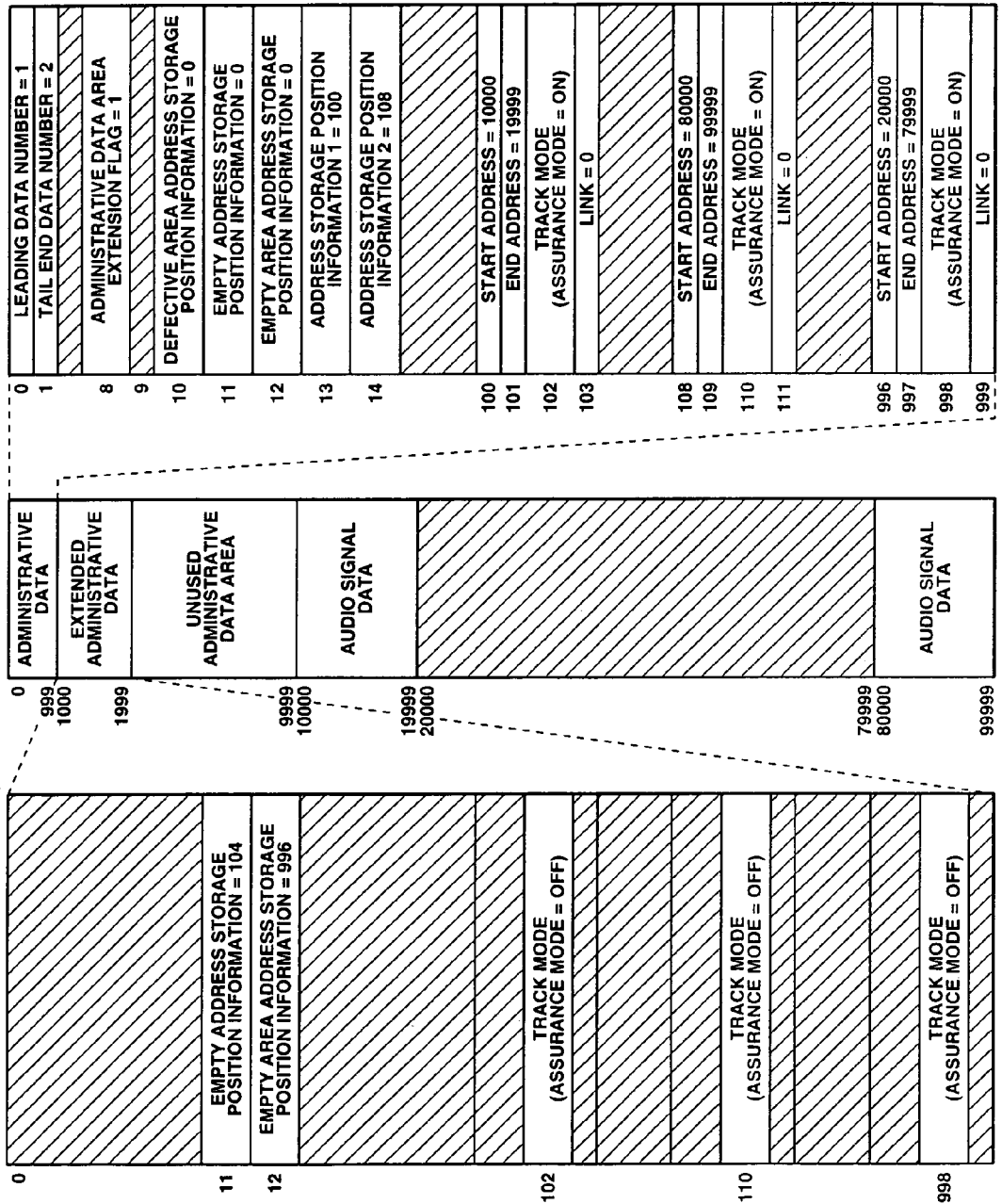
FIG. 20 is a schematic illustration of a recording format that can be used when recording a string of codes by means of an apparatus adapted to a set of old standards.

FIG. 20 shows a format that can be used with the embodiment and corresponds to the format of FIG. 19 so that an apparatus adapted to the new standards can operate for reproducing signals, recording additional signals and editing and erasing signals but an apparatus adapted to the old standards can only operate for reproducing signals and is prohibited from additional recording, editing and erasing.

Referring to FIG. 20, address 0 through address 999 are in the management data area that the apparatus adapted to the old standards can refer to but address 1000 through 9999 are in the management data area (which is called extended management data area) that only an apparatus adapted to the new standards can refer to and hence the apparatus adapted to the old standards cannot. The track mode information stored in the management data area is copied and stored in the extended management data area. In the instance of format of FIG. 20, the protection mode of the track mode recorded in each of the slots in the management data area is flagged (or the track protection flag is made equal to 1 (ON). As a result, with the format of FIG. 20, any accident of erasing, if partly, the audio signal data (the addresses stored in the slots of the management data area to be accurate) that can be caused by the use of an apparatus adapted to the old standards is prevented from occurring while the apparatus adapted to the new standards can understand the true protection mode of the track.

The positions storing the track mode information in the extended management data area are same in relative terms as the positions storing the track mode information in the management data area that the apparatus adapted to the old standards can access as viewed from the top of each of the areas. For example, in FIG. 20, the track mode information is stored at addresses that are respectively the 102th, the 110th and the 998th in the management data area, while the same information obtained by copying the track mode information in the management data area is stored at addresses that are also respectively the 102th, the 110th and the 998th in the extended management data area. The positions storing the track mode information in the extended management data area are made same in relative terms as the positions storing the track mode information in the management data area because the track mode information is referred to by the information on address storing positions in the management data area. Of course, it is also possible to realize an embodiment that is adapted to store the information on the address storing positions in the extended management data area.

Then, with the format of FIG. 20, the information on idle address storing positions (idle slot positions) in the management data area is made equal to 0 in order to disenable any attempt for additionally recording new data on the disk by an apparatus adapted to the old standards, whereas the original information on idle address storing positions (idle slot positions) stored in the management data area is recorded in the storage area of the extended management data area for storing information on idle address storing positions (idle slot positions) in order to enable the apparatus adapted to the new standards to operate for recording, editing and so on. Then, the slots in the management data area become no longer available to the apparatus adapted to the old standards so that it cannot record any data nor split any audio signal data as editing operation.

Furthermore, in the instance of the format of FIG. 20, the information on idle area address storing positions in the management data area is set to zero in order to disable any attempt for additionally recording new data, whereas the original information on idle area address storing positions stored in the management data area is recorded in the storage area of the extended management data area for storing information on idle area address storing positions. As a result, no available storage area exists to the apparatus adapted to the old standards if the latter tries to record additional data so that it cannot record any data nor operate for editing.

Thus in the instance of the format of FIG. 20, it can be so arranged by combining the above described techniques that an apparatus adapted to the old standards can only reproduce data from the disk and cannot operate for recording, editing and erasing, whereas an apparatus adapted to the new standards can operate not only for reproduction but also recording, editing and erasing.

Figure 21:
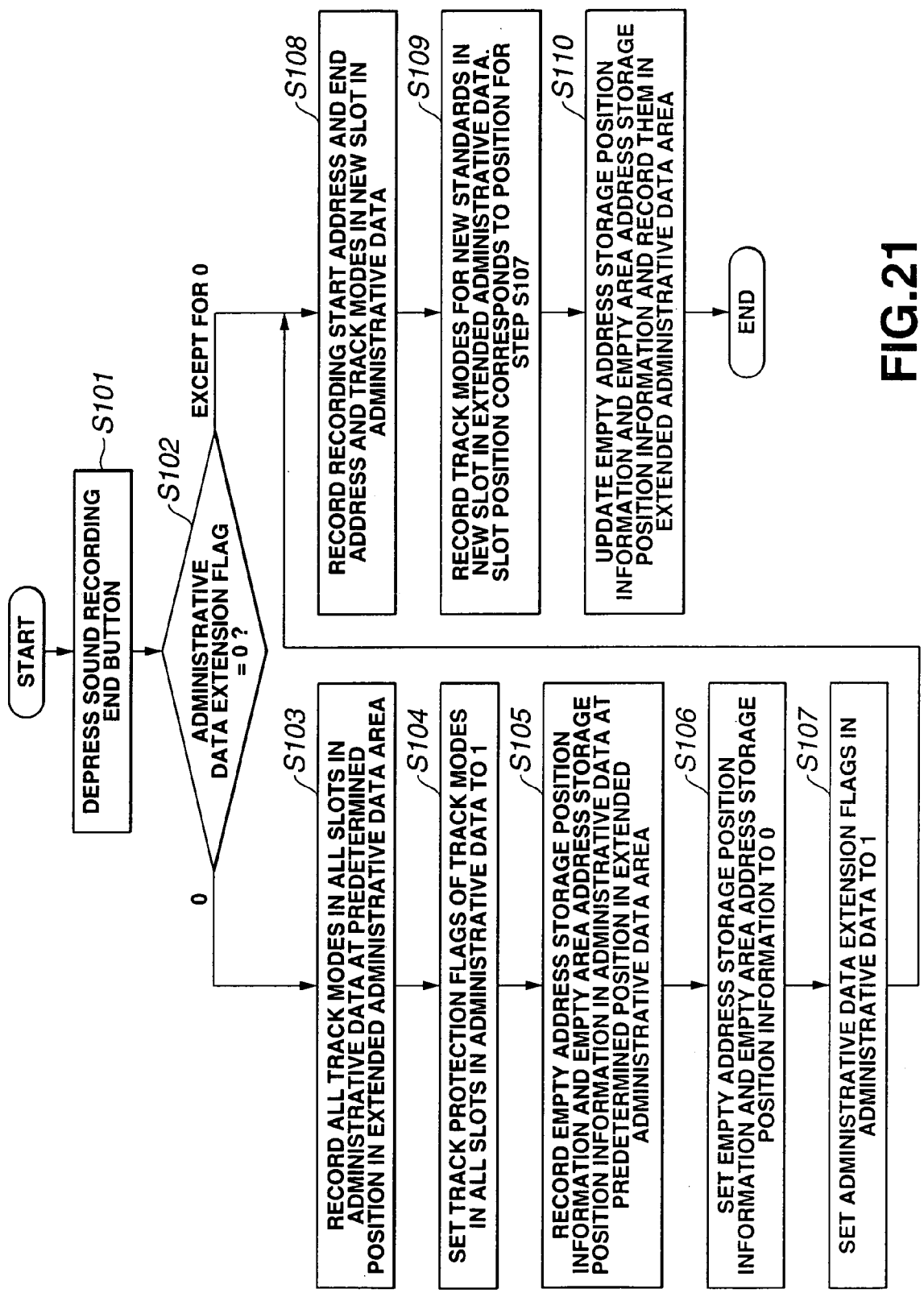
FIG. 21 is a flow chart illustrating the flow of the processing operation of recording the format of FIG. 20 when a signal recording operation is over.

FIG. 21 is a flow chart that can be used for this embodiment of compressed data recording/reproduction apparatus to operate for recording, using in the recording format of FIG. 20.

Referring to FIG. 21, firstly, if the stop button is depressed by the user to terminate the current recording operation in Step S101, the embodiment of compressed data recording/ reproduction apparatus refers to the management data extension flag read out from the management data area of the disk in Step S102.

If it is determined in Step S102 that the management data extension flag is not 0, the compressed data recording/reproduction apparatus stores the recording start address, the recording end address and the track mode in a new slot of the management data area in Step S108 and also stores the tack mode for the new standards in a new slot of the extended management data in Step S109. Note that this slot position corresponds to that of Step S107 which will be described hereinafter. Then, the compressed data recording/reproduction apparatus updates the information on idle address storing positions (idle slot information) and the information on idle area address storing positions (idle area slot positions) in the management data area and, at the same time, stores the information on idle address storing positions (idle slot information) and the information on idle area address storing positions (idle area slot positions) in the extended management data area in Step S110.

If, on the other hand, it is determined in Step S102 that the management data extension flag is equal to 0, the compressed data recording/reproduction apparatus copies the track mode in all the slots of the management data and stores them in the corresponding address positions in the extended management data area in Step S103. Subsequently, in Step S104, the apparatus sets all the track protection flags of the track mode in the management data to 1 and, in Step S105, it stores the information on idle area address storing positions (idle area slot positions) in the predetermined positions of the extended management data (in the instance of FIG. 20, they are address 11 and address 12 from the top of the extended management data area). Then, in Step S106, the compressed data recording/reproduction apparatus sets the original information on idle address storage positions and the information on idle area address storage positions in the management data area equal to 0. Thereafter, in Step S107, the compressed data recording/reproduction apparatus turns the management data extension flag to 1 and proceeds to Step S108.

While the positions storing different pieces of information in the extended management data area are same as those of their counterparts in the management data area as viewed from the top thereof, other embodiments of the present invention where the former positions are different from the corresponding positions in the management data area may feasibly be realized.

While the data in the management data area and those in the extended management data area that are modified are stored in the recording medium after the modification in the above described embodiment, it may alternatively be so arranged that the data to be modified are read into the memory of the apparatus when the recording medium is used and, after modifying them by means of the above described technique and after the use of the recording medium, the data are stored in the recording medium.

While FIG. 21 shows an operation of recording strings of codes adapted to the new standards, if no code string adapted to the new standards exists on the recording medium when an apparatus adapted to the new standards is used to record strings of codes adapted to the old standards, it is possible to record them by means of the apparatus adapted to the new standards, using only the existing management data area. On the other hand, it is also possible to an apparatus adapted to the new standards to handle both management data and extended management data by using both the management data area and the extended management data are regardless if the strings of code to be recorded are adapted to the old standards or the new standards.

Figure 22:
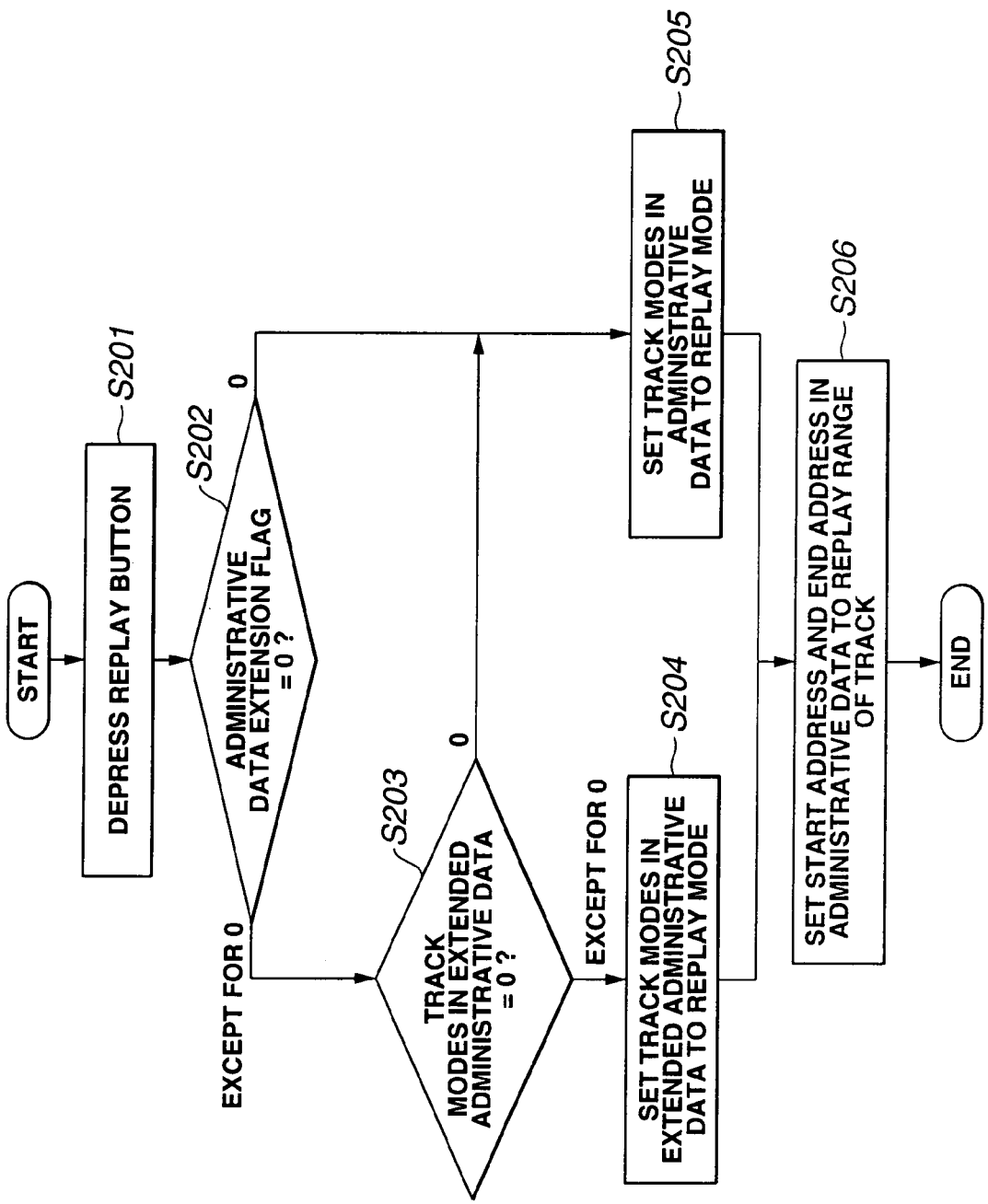
FIG. 22 is a flow chart illustrating the flow of the processing operation of replaying the disk storing data in the format of FIG. 20.

FIG. 22 is a flow chart that can be used when replaying a disk carrying data recorded in the recording format of FIG. 20 by means of the embodiment of compressed data recording/reproduction apparatus illustrated in FIG. 1 and described above.

Referring to FIG. 22, if the replay button is depressed by the user in Step S201, the compressed data recording/reproduction apparatus determines in Step S202 if the management data are extended or not by referring to the management data extension flag in the management data area.

If it is determined in Step S202 that the management data extension flat is equal to 0 and hence the management data are not extended, in Step S205, the apparatus selects the reproduction mode by referring to the track mode at the position corresponding to the specified track in the management data, following the steps same as those taken by an apparatus adapted to the old standards. Then, in Step S206, it refers to the start address and the end address at the corresponding positions of the specified track in the management data and defines the scope of reproduction by using the addresses.

If, on the other hand, it is determined in Step S202 that the management data extension flag is not equal to 0, the compressed data recording/reproduction apparatus determines in Step S203 if the track mode of the position corresponding to the specified track mode in the extended management data that is stored in the extended data area is equal to 0 or not.

If it is determined in Step S203 that the track mode in the extended management data is equal to 0, the compressed data recording/reproduction apparatus determines that the strings of codes recorded on the track are those adapted to the old standards and proceeds to Step S205.

If, on the other hand, it is determined in Step S203 that a value other than 0 is recorded in the track mode, then in Step S204, the compressed data recording/reproduction apparatus specifies the reproduction mode for the track mode in the extended management data and proceeds to Step S206, where it specifies addresses in a manner as described above and carries out a data reproducing operation.

While the strings of codes adapted to the new standards are reproduced by an apparatus adapted to the new standards in the track mode according to the new standards in the track mode according to the new standards in the illustration of FIG. 22, it may alternatively be arranged so that the apparatus adapted to the new standards can select either the track mode according to the new standards or the track mode according to the old standards.

Figure 23:
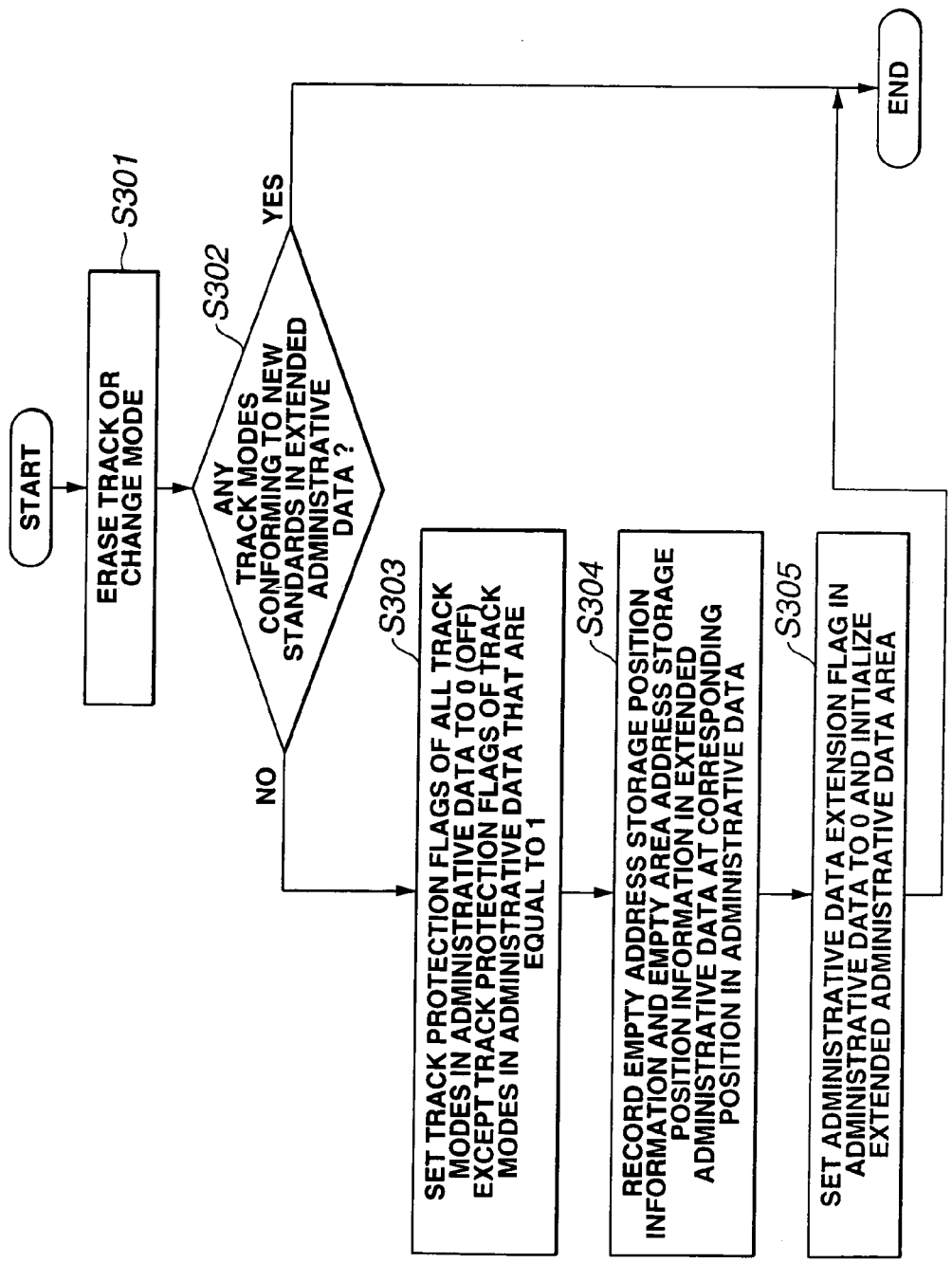
FIG. 23 is a flow chart illustrating the flow of the processing operation conducted when no string of codes according to the new standards is left in the format of FIG. 20 as a result of an editing or erasing operation.

FIG. 23 shows a flow chart that can be used with this embodiment of compressed data recording/reproduction apparatus when there remains no string of codes adapted to the new standards on the disk as a result of a data editing or erasing operation.

Referring to FIG. 23, when there no longer exists any string of codes adapted to the new standards as a result of a track erasure or mode change operation in Step S301, the compressed data recording/reproduction apparatus determines in Step S302 if there remains any track mode adapted to the new standards in the extended management data or not.

If it is determined in Step S302 that all the track modes in the extended management data are those adapted to 0 or the old standards (No), the compressed data recording/reproduction apparatus, as operation of Step S303 turns the track protection flags of all the track modes in the management data to 0 provided that they correspond to the track modes in the extended management data whose track protection flags are not equal to 1.

Then, in Step S304, the compressed data recording/reproduction apparatus stores the information on idle address storing positions and the information on idle area address storing positions at the corresponding positions of the management data.

Furthermore, in Step S305, the compressed data recording/reproduction apparatus turns the management data extension flag in the management data to 0 and initializes the extended management data area.

When a recording medium is made to carry only strings of codes adapted to the old standards as a result of the use of an apparatus adapted to the new standards and has to be used with an apparatus adapted to the new standards, the above described embodiment can operate for editing, recording and erasing data without restrictions by following the flow chart of FIG. 23.

While an unused part of the management area (unused management data area) that is reserved and prohibited from being used with the old standards is used as management area of the information that can be accessed only by an apparatus adapted to the new standards in the instance of format of FIG. 20, the present invention is by no means limited to such an embodiment and a so-called data area where audio signal data are stored may be used as information management area that can be accessed only by an apparatus adapted to the new standards.

Figure 24:
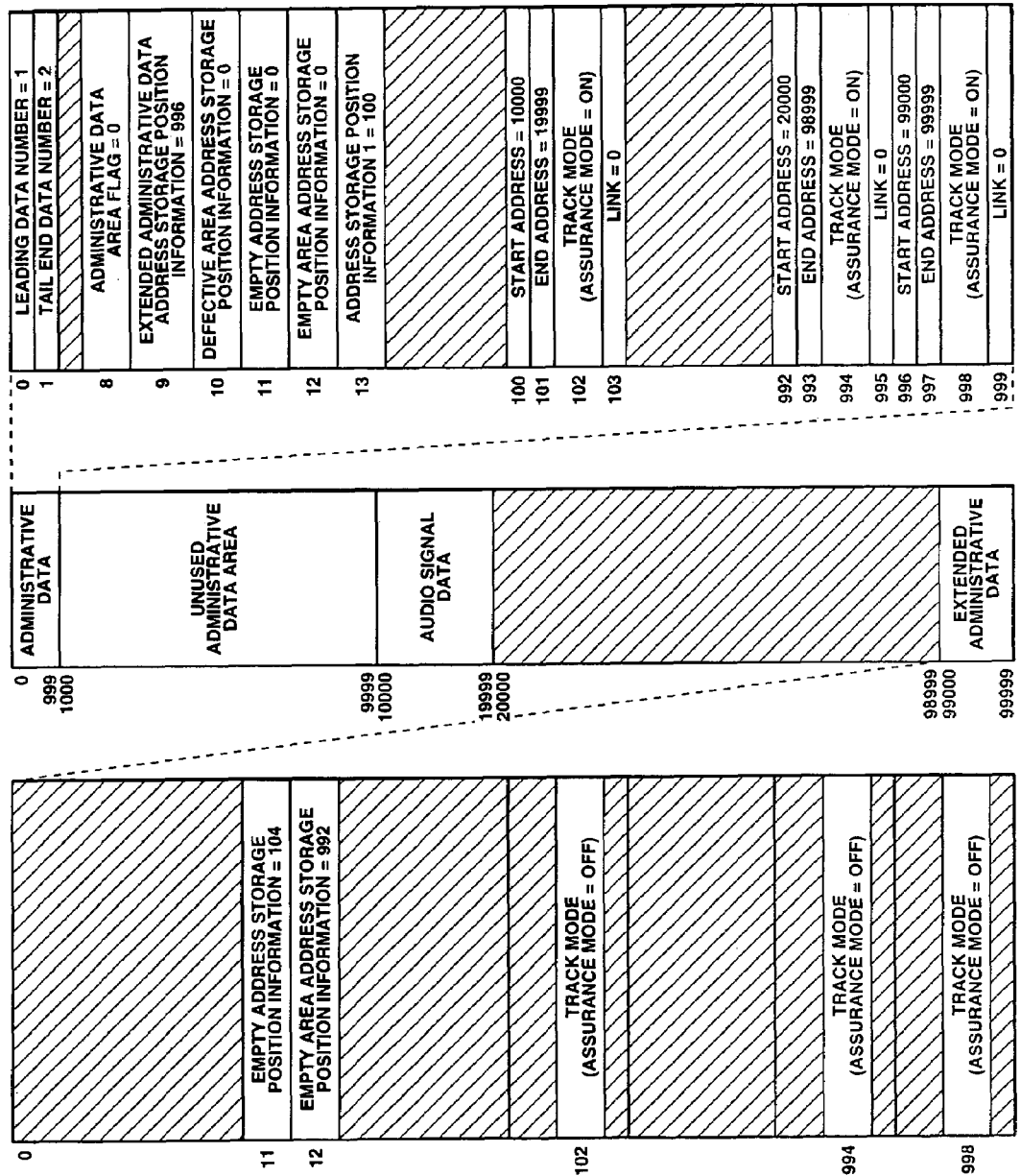
FIG. 24 is a schematic illustration of the recording format to be used when arranging an extended management data area in other than the unused management data area of FIG. 19.

FIG. 24 shows a format that can be used when the extended management data are stored in a data area other than the unused management data area.

In the instance of FIG. 24, the management data extension flag at address 8 in the management data area is not used and, instead, the positions where the addresses of the extended management data are stored are stored in the information on extended management data address storing position at address 9. In other words, it is so arranged that the extended management data can be stored at any position on the recording medium. Then, the start address and the end address of the extended management data are stored in a slot of the management data and the slot position is stored in the storage area of the information on extended management data address storing positions.

In the case of the recording format of FIG. 24, an apparatus adapted to the new standards can recognize a recording medium that stores strings of codes adapted to the new standards at the time of data reproduction so long as the extended management data address storing position at address 9 is specified. On the other hand, if the management data extension flag is 0, the apparatus recognizes that the recording medium carries no string of codes adapted to the new standards and hence is adapted to the old standards.

Apart from the instance of FIG. 24, any unused area in the management data can be used as area for storing extended management data address positions as some different embodiment. If circumstances allows, the information on defective area address storing positions at address 10 in the management data may be used.

Or, the technique described by referring to FIG. 24 and the one described by referring to FIG. 20 may be combined. For example, it is possible to use the format of FIG. 20 as base and store the extended management data in the extended data area and also in the data area of the format of FIG. 24 in order to enhance the security of the extended management data.

Furthermore, the present invention is applicable to an apparatus adapted to the old standards. For example, if the apparatus is manufactured without the feature of adapting itself to a codec conforming to the new standards for the reason of manufacturing cost, it may be made to be able to record, edit and erase strings of codes adapted to the new standards and also those adapted to the old standards by applying the above described data management technique, although it cannot reproduce strings of codes adapted to the new standards. Differently stated, an apparatus adapted to the old standards and, at the same time, record, access and process extended management data can be realized. Thus, it is now possible to provide highly versatile apparatus at low cost.

While the present invention is described above in terms of audio signals, the method according to the invention can be applied to occasions where the signals reproduced by an apparatus adapted to old standards are video signals. Additionally, while the present invention is described above in terms of coded bit streams on a recording medium, the method according to the invention can be applied to transmission of bit streams. Finally, the recording medium is not limited to those listed above and a semiconductor memory can also be used as recording medium for the purpose of the present invention.

What is claimed is:

1. An information management method comprising:
generating protection information for protecting the storage area of a recording medium storing a second string of codes recorded by a second audio coding technique from any recording, editing and erasing operations of a first apparatus adapted to handle a first string of codes by a first audio coding technique and by referring to first management data stored in a first management data area;
arranging said protection information in the first management data area as one of said first management data; and
protecting the storage area of the medium storing said second string of codes from any recording, editing and erasing operations of said first apparatus, while allowing reproducing operations of said first apparatus, on the basis of said protection information when the medium storing said second string of codes is operated by said first apparatus,
wherein said protection information includes a protection mode for a track on the medium, the protection mode indicating that the track is prohibited from rewriting.

2. The information management method according to claim 1, wherein said first apparatus is permitted to reproduce only the part of the first string of codes on the basis of said protection information when a single string of codes generated by means of both said first audio coding technique and said second audio coding technique is recorded on said recording medium.

3. The information management method according to claim 1, wherein said protection information indicates that the area that can be used by said first apparatus for recording is made nil in said area on the medium or said area on the medium is made smaller than the allowable area of said first apparatus.

4. The information management method according to claim 1, wherein said protection information indicates that the storage information of the address information indicating the position of the area on the medium that can be used for recording by said first apparatus is made equal to nil.

5. The information management method according to claim 1, wherein
- a second management data area that can be referred to only by a second apparatus adapted to handle the second string of codes or both the first string of codes and the second string of codes is provided on said medium and
- the first management data area is arranged in said second management data area except for said protection information.

6. The information management method according to claim 5, wherein said second apparatus is adapted to refer to both said first management data area and said second management data area.

7. The information management method according to claim 6, wherein said second apparatus is adapted to disregard said first management data area and refers to only the second management data area when said protection information is arranged in said first management data area.

8. The information management method according to claim 5, wherein said second apparatus initializes said first management data area and allows the medium to be used by said first apparatus for recording, editing and erasing when said second string of codes no longer exists on said medium.

9. An information management apparatus comprising:
- a means for generating protection information for protecting the storage area of a recording medium storing a second string of codes recorded by a second audio coding technique from any recording, editing and erasing operations of a first apparatus adapted to handle a first string of codes by a first audio coding technique and by referring to first management data stored in a first management data area;
- a means for arranging said protection information in the first management data area as one of said first management data, wherein
- said protection information includes a protection mode for a track on the medium, the protection mode indicating that the track is prohibited from rewriting; and
- a means for protecting the storage area of the medium storing said second string of codes from any recording, editing and erasing operations of said first apparatus, while allowing reproducing operations of said first apparatus, on the basis of said protection information when the medium storing said second string of codes is operated by said first apparatus.

10. The information management apparatus according to claim 9, wherein said first apparatus is permitted to reproduce only the part of the first string of codes on the basis of said protection information when single string of codes generated by means of both said first audio coding technique and said second audio coding technique is recorded on said recording medium.

11. The information management apparatus according to claim 9, wherein said protection information indicates that the area that can be used by said first apparatus for recording is made nil in said area on the medium or said area on the medium is smaller than the allowable area of said first apparatus.

12. The information management apparatus according to claim 10, wherein said protection information indicates that the storage information of the address information indicating the position of the area on the medium that can be used for recording by said first apparatus is made equal to nil.

13. The information management apparatus according to claim 10, wherein
- a second management data area that can be referred to only by a second apparatus adapted to handle the second string of codes or both the first string of codes and the second string of codes is provided on said medium and
- the first management data area is arranged in said second management data area except said protection information.

14. The information management apparatus according to claim 13, wherein said second apparatus is adapted to refer to both said first management data area and said second management data area.

15. The information management apparatus according to claim 14, wherein said second apparatus is adapted to disregard said first management data area and refers to only the second management data area when said protection information is arranged in said first management data area.

16. The information management apparatus according to claim 15, wherein said second apparatus initializes said first management data area and allows the medium to be used by said first apparatus for recording, editing and erasing when said second string of codes no longer exists on said medium.

* * * * *